(12) United States Patent
Lee et al.

(10) Patent No.: US 12,331,251 B2
(45) Date of Patent: Jun. 17, 2025

(54) DEVICE AND METHOD FOR CONTINUOUS LOW-TEMPERATURE PYROLYSIS

(71) Applicant: ENTOP TECHNOLOGY CO., LTD., Gimcheon-si (KR)

(72) Inventors: Mi Young Lee, Gimcheon-si (KR); Hyun Soo Anh, Gimcheon-si (KR)

(73) Assignee: ENTOP TECHNOLOGY CO., LTD., Gimcheon-si (KR)

( * ) Notice: Subject to any disclaimer, the term of this patent is extended or adjusted under 35 U.S.C. 154(b) by 0 days.

(21) Appl. No.: 18/575,096

(22) PCT Filed: Jun. 29, 2022

(86) PCT No.: PCT/KR2022/009303
§ 371 (c)(1),
(2) Date: Jan. 19, 2024

(87) PCT Pub. No.: WO2023/277565
PCT Pub. Date: Jan. 5, 2023

(65) Prior Publication Data
US 2024/0301295 A1    Sep. 12, 2024

(30) Foreign Application Priority Data

Jul. 2, 2021 (KR) .................. 10-2021-0086926
Jun. 28, 2022 (KR) .................. 10-2022-0079083

(51) Int. Cl.
*C10G 1/10* (2006.01)
*C10B 47/44* (2006.01)
(Continued)

(52) U.S. Cl.
CPC ............... *C10G 1/10* (2013.01); *C10B 47/44* (2013.01); *C10B 53/07* (2013.01); *C10B 57/14* (2013.01);
(Continued)

(58) Field of Classification Search
CPC ......... C10B 47/44; B10B 53/07; B10B 53/14; C10G 1/10; C10G 5/06; C10G 2300/1003; C10G 2300/4081
See application file for complete search history.

(56) References Cited

U.S. PATENT DOCUMENTS 4,647,443 A    3/1987 Apffel et al.

FOREIGN PATENT DOCUMENTS

EP    1190014 A1 *  3/2002  ............ B01D 5/0036
JP    09-235561 A     9/1997
(Continued)

OTHER PUBLICATIONS

KR Office Action in Application No. 10-2022-0079083 dated Jul. 28, 2022.
KR Notice to rejection decision patent in Application No. 10-2022-0079083 dated Nov. 18, 2022.
KR Notice for decision of patent in Application No. 10-2022-0079083 dated Dec. 8, 2022.

*Primary Examiner* — Brian A McCaig
(74) *Attorney, Agent, or Firm* — Maschoff Brennan

(57) ABSTRACT

The present invention relates to a device and a method for low-temperature pyrolysis, wherein: waste tire chips are continuously supplied; since a pneumatic method of an intake method and a blowing method is adopted, the waste tire chips may be quickly fed (supplied) by a simple method, and only the waste tire chips may be supplied into a pyrolysis reactor but the inflow of air thereinto may be fundamentally blocked, thereby increasing the pyrolysis efficiency of the pyrolysis reactor and preventing the explosion reaction thereof; and unlike the prior art, a mechanical conveyor supply method is not used, and thus waste tire chip supply equipment can be miniaturized and modularized, thereby enabling the compact design of the pyrolysis equipment, facilitating a pyrolysis operation, facilitating mainte- (Continued)

nance, and significantly reducing the site area of the pyrolysis equipment or the cost of manpower input for supplying waste tire chips.

14 Claims, 13 Drawing Sheets

(51) Int. Cl.
*C10B 53/07* (2006.01)
*C10B 57/14* (2006.01)
*C10G 5/06* (2006.01)
(52) U.S. Cl.
CPC ....... *C10G 5/06* (2013.01); *C10G 2300/1003* (2013.01); *C10G 2300/4081* (2013.01)

(56) References Cited

FOREIGN PATENT DOCUMENTS

| KR | 10-2002-0010633 A | 2/2002 |
|----|-------------------|--------|
| KR | 10-2009-0117377 A | 11/2009 |
| KR | 10-1147993 B1 | 5/2012 |
| KR | 10-2012-0084222 A | 7/2012 |
| KR | 10-2014-0016451 A | 2/2014 |
| KR | 10-2010-00048452 A | 5/2015 |
| KR | 10-2015-0053462 A | 5/2015 |
| KR | 10-2020-0126707 A | 11/2020 |
| KR | 10-2020-0133536 A | 11/2020 |
| KR | 10-2262779 B1 | 6/2021 |
| KR | 10-2022-0102386 A | 7/2022 |

\* cited by examiner

DEVICE AND METHOD FOR CONTINUOUS LOW-TEMPERATURE PYROLYSIS

TECHNICAL FIELD

The present invention relates to a device and a method for continuous low-temperature pyrolysis, which continuously pyrolyze a waste tire chip to generate carbon black and oil, and more particularly, to a device and a method for continuous low-temperature pyrolysis, in which: waste tire chips are continuously supplied, such that a pneumatic method is adopted to rapidly feed the waste tire chips by a simple scheme and supply only the waste tire chips into a pyrolysis reactor while introduction of air is fundamentally blocked, so that pyrolysis efficiency of the pyrolysis reactor is increased, a risk of explosion is minimized, and carbon black is recovered rapidly and efficiently by an intake method; unlike the related art, a mechanical conveyor supply scheme is not used, so that a pyrolysis operation is facilitated, maintenance and repair is facilitated, and a site area of a pyrolysis facility, a cost of manpower input for supplying the waste tire chips, or the like is significantly reduced; and an oil film is formed while spraying oil upward into a condensing chamber to expand a contact area between a pyrolysis gas, which has a relatively high temperature, and the oil film, so that condensation efficiency of the pyrolysis gas is increased.

BACKGROUND ART

As society develops rapidly to allow life to become more prosperous, interest in the environment is increased to actively conduct researches in various ways on a method for recycling waste, and a waste disposal method capable of reducing environmental pollution.

Recently, as the spread of vehicles has accelerated, a demand for tires has been increased, so that an amount of waste tires has been increased.

As is well known, the waste tire is mainly formed of a synthetic polymer compound, and has a calorific value of about 34 MJ/kg, which is higher than a reference calorific value of coal, which is 29 MJ/kg. An average composition of the tire except for fabrics such as an iron core and nylon may include 43.5 wt % of a styrene butadiene rubber (SBR) polymer, 32.6 wt % of carbon black, 21.7 wt % of oil, and 2.2 wt % of an additive such as sulfur and zinc oxide.

When burning the waste tires, numerous environmental pollutants such as sulfur oxides, unburned hydrocarbons, and exhaust fumes may be generated, so that the Ministry of Environment has prohibited use of the waste tires as fuel.

Accordingly, a method for utilizing the waste tires as something except for fuel are being studied, and the waste tires are being commercialized as recycled products such as sidewalk blocks, recycled tires, recycled rubber, artificial reefs, and cushioning materials for various structures. However, the application scope of the waste tires is limited, waste and pollution may occur in a commercialization process for recycling the waste tires, and environmental pollution caused by waste is also emerging as a serious problem when disposing of the recycled products.

Meanwhile, various methods for converting waste tires into fuel are being attempted, and a method for pyrolyzing a waste tire may be used as the method for converting the waste tires into the fuel.

The waste tire may include a pyrolytic component pyrolyzed to have a low molecular weight when heat is applied, and a non-pyrolytic component that is not pyrolyzed.

The pyrolyzed component may occupy about 50% or more of the waste tire, and the non-pyrolytic component except for the iron core may mainly include carbon black used as a tire raw material, and inorganic materials used as various additives.

In addition, when the waste tire is heated to a pyrolysis temperature, it was found that a polymer chain is cleaved and decomposed so as to be gasified, the non-pyrolytic material remains as a solid residue, and pyrolysis oil may be obtained by condensing a gasified material.

However, conventional pyrolysis devices and methods have the following problems.

First, while supplying waste tire chips, since a batch scheme is used, it may be difficult to continuously supply the waste tire chips; since the waste tire chips are supplied by a mechanical scheme (e.g., a conveyor supply scheme), a plurality of conveyors may be installed, so that an entire pyrolysis device including a waste tire chip supply facility may be inevitably enlarged; and an installation cost of the pyrolysis device, a site area of the pyrolysis device, a cost of manpower input for supplying the waste tire chips, or the like may be significantly increased.

In addition, when the waste tire chips are supplied by a continuous scheme with a mechanical conveyor structure, air may be introduced into a pyrolysis reactor together with the waste tire chips, so that pyrolysis efficiency of the pyrolysis reactor may be significantly reduced, and a risk of explosion may be increased during a pyrolysis reaction.

In addition, while generating oil by condensing a pyrolysis gas, since a conventional simple condensation scheme is used, condensation efficiency of the pyrolysis gas may be significantly reduced, so that an oil yield may be reduced, and a foreign substance may remain in the oil, resulting in low oil quality.

In addition, while recovering carbon black, the carbon black may be recovered by a mechanical scheme (e.g., a conveyor supply scheme), such that air may be introduced into the pyrolysis reactor during a carbon black recovery process by an open connection structure between the pyrolysis reactor and a carbon black recovery facility, in which a plurality of conveyors have to be installed to prevent the introduction of the air. For this reason, the entire pyrolysis device including the carbon black recovery facility may be enlarged, and the installation cost of the pyrolysis device, the site area of the pyrolysis device, a cost of manpower input for recovering the carbon black, or the like may be significantly increased.

DISCLOSURE

Technical Problem

The present invention has been devised to improve the problems described above, and a first object of the present invention is to provide a device and a method for continuous low-temperature pyrolysis, in which: waste tire chips may be continuously supplied, such that the waste tire chips may be fed (supplied) by a pneumatic method of an intake method and a blowing method, and only the waste tire chips may be supplied into a pyrolysis reactor while introduction of air is fundamentally blocked, so that pyrolysis efficiency of the pyrolysis reactor may be increased, and a risk of explosion may be minimized; and unlike the related art, a mechanical conveyor supply scheme may not be used, so that a waste tire chip supply facility may be miniaturized and modularized, which enables a compact design of a pyrolysis facility, a pyrolysis operation may be facilitated, maintenance and repair may be facilitated, and a site area of the pyrolysis facility, a cost of manpower input for supplying the waste tire chips, or the like may be significantly reduced.

A second object of the present invention is to provide a device and a method for continuous low-temperature pyrolysis, in which a condensing module for condensing a pyrolysis gas to generate oil forms an oil film while spraying oil upward into a condensing chamber to expand a contact area between the pyrolysis gas, which has a relatively high temperature, and the oil film, so that condensation efficiency of the pyrolysis gas may be increased, and thus an oil yield may be significantly improved.

A third object of the present invention is to provide a device and a method for continuous low-temperature pyrolysis, in which carbon black may be recovered efficiently and rapidly by a suction supply scheme, such that, unlike the related art, a mechanical conveyor recovery scheme may be not used, so that a carbon black recovery facility may be miniaturized and modularized, which enables a compact design of a pyrolysis facility, a pyrolysis operation may be facilitated, maintenance and repair may be facilitated, and a site area of the pyrolysis facility, a cost of manpower input for recovering the carbon black, or the like may be significantly reduced.

A fourth object of the present invention is to provide a device and a method for continuous low-temperature pyrolysis, in which a screw shaft may be installed inside a pyrolysis reactor of a pyrolysis module, such that the screw shaft is arranged eccentrically with respect to a center of the pyrolysis reactor, so that clogging of a waste tire chip may be effectively prevented.

A fifth object of the present invention is to provide a device and a method for continuous low-temperature pyrolysis, in which a pyrolysis reactor cleaning module may be provided to efficiently clean an inside of a pyrolysis reactor, so that pyrolysis efficiency may be improved.

Technical objects of the present invention are not limited to the technical objects described above, and other technical objects that are not described above will be clearly understood by those skilled in the art from the following description.

Technical Solution

To achieve the objects described above, the present invention provides a device and a method for continuous low-temperature pyrolysis.

According to the present invention, there is provided a device for continuous low-temperature pyrolysis, which continuously supplies a waste tire chip, performs low-temperature pyrolysis to generate carbon black and a pyrolysis gas (P-gas), and condenses the pyrolysis gas to generate oil (pyrolysis oil), the device including: a waste tire chip supply module (supply module for waste tire chip) for continuously supplying the waste tire chip, such that the waste tire chip is supplied by an intake method and a blowing method; a pyrolysis module for pyrolyzing the waste tire chip supplied from the waste tire chip supply module to generate the carbon black and the pyrolysis gas; a carbon black conveying module (conveying module for carbon black) for conveying the carbon black generated by the pyrolysis module to an outside of the pyrolysis module; a carbon black recovery module (recovery module for carbon black) for conveying and storing the carbon black, which is conveyed by the carbon black conveying module, into a carbon black storage tank; a condensing module for condensing the pyrolysis gas generated by the pyrolysis module to generate the oil; and an oil recovery tank for recovering the oil generated by the condensing module.

In addition, the waste tire chip supply module may include:
a waste tire chip supply hopper (supply hopper for waste tire chip) for inputting the waste tire chip into a pyrolysis reactor of the pyrolysis module; a plurality of waste tire chip silos (silos for waste tire chip) for temporarily storing the waste tire chip supplied from the waste tire chip supply hopper, and supplying the waste tire chip into a first conveyor of the pyrolysis module; a silo selection valve (opening/closing valve) for supplying the waste tire chip by alternately selecting the waste tire chip silos so that the waste tire chip is continuously supplied into the first conveyor, a back filter module for collecting (adsorbing) and filtering out a foreign substance introduced into the waste tire chip silo; and a waste tire chip supply blower (blower for supplying waste tire chip) for sucking air introduced into the waste tire chip silo, and blowing the waste tire chip together with the air into the waste tire chip silo to supply the waste tire chip and the air by a feeding scheme, the waste tire chip supply blower may be driven to re-suck air from the back filter module, and blow and feed the waste tire chip together with the sucked air into the waste tire chip silo, the air inside the waste tire chip silo may be sucked and removed to supply only the waste tire chip into the pyrolysis reactor and block introduction of the air, and the silo selection valve may open and close a waste tire supply line so as to be opened only toward the waste tire chip silo that requires supply of the waste tire chip among the waste tire chip silos, so that the waste tire chip is continuously input into the pyrolysis reactor.

In addition, a waste tire chip supply blocking unit for selectively supplying or blocking the waste tire chip may be further installed in a lower portion of the waste tire chip silo.

In addition, a nitrogen gas supply unit for supplying a nitrogen gas may be further installed in the lower portion of the waste tire chip silo to prevent an explosive reaction caused by the introduction of the air into the pyrolysis reactor of the pyrolysis module.

In addition, the pyrolysis module may include:
a pyrolysis reactor for accommodating the waste tire chip supplied from the waste tire chip supply module; a screw shaft rotatably installed inside the pyrolysis reactor to stir and convey the waste tire chip accommodated in the pyrolysis reactor, such that the screw shaft is installed eccentrically with respect to a center of the pyrolysis reactor to prevent clogging of the waste tire chip; a screw shaft driving motor unit for rotating the screw shaft; a first conveyor connected to one side of the pyrolysis reactor to input the waste tire chip into the pyrolysis reactor; a heating jacket installed on an outer periphery of the pyrolysis reactor to heat the outer periphery of the pyrolysis reactor to pyrolyze the waste tire chip; and a heating unit (heating means) for supplying heat into the heating jacket.

In addition, according to the present invention, the device for the continuous low-temperature pyrolysis may further include
a non-condensable pyrolysis gas blowing fan for using a non-condensed pyrolysis gas that has passed through the condensing module as a raw material for the heating unit.

In addition, a waste tire chip silo of the waste tire chip supply module may be preheated by using a heat source of a high-temperature exhaust gas discharged from an outlet of the heating jacket or a non-condensable gas discharged from a condensing chamber.

In addition, the carbon black conveying module may include:
   a second conveyor including a screw conveyor for conveying the carbon black generated by a pyrolysis reactor of the pyrolysis module to an outside of the pyrolysis reactor, and having one side formed with a carbon black introduction part for introducing the carbon black and an opposite side formed with a carbon black discharge part for discharging the carbon black; and a first cooling jacket connected to a coolant supply tank for supplying a coolant, and installed on an outer periphery of the second conveyor to cool the carbon black conveyed from the second conveyor.

In addition, according to the present invention, the device for the continuous low-temperature pyrolysis may further include: an oil storage tank for storing the oil conveyed to the oil recovery tank (reception tank); and a circulation pump for supplying a part of the oil stored in the oil storage tank to the condensing module.

In addition, an air supply unit (air supply means) may be installed in a lower portion of the oil storage tank, and an impurity vent unit (vent means) may be installed in an upper portion of the oil storage tank, so that air injected by the air supply unit may generate air bubbling to remove an impurity contained in the oil stored in the oil storage tank, and the removed impurity may be discharged to an outside of the oil storage tank through the impurity vent unit.

In addition, the condensing module may include:
   at least one condensing chamber for condensing the pyrolysis gas supplied from a pyrolysis reactor of the pyrolysis module to generate the oil; a second cooling jacket connected to a coolant supply tank for supplying a coolant, and installed on an outer periphery of the condensing chamber to cool and condense the pyrolysis gas; and a first oil spray nozzle installed inside the condensing chamber to form an oil film while spraying the oil supplied from an oil supply unit upward, and
   a contact area between the pyrolysis gas, which has a relatively high temperature, and the oil film may be expanded to increase condensation efficiency of the pyrolysis gas.

In addition, when a plurality of condensing chambers are provided, the condensing chambers may be connected to each other by a connection pipe so that the pyrolysis gas may be sequentially condensed, and a second oil spray nozzle for spraying the oil supplied from the oil supply unit may be installed inside the connection pipe to rapidly cool the pyrolysis gas.

In addition, a foreign substance removal nozzle for spraying the oil at a high pressure toward the pyrolysis gas to collect a foreign substance included in the pyrolysis gas and allow the foreign substance to be dropped downward may be installed inside the condensing chamber.

In addition, a foreign substance filter unit for filtering out the foreign substance may be further installed directly under the foreign substance removal nozzle.

In addition, the carbon black recovery module may include:
   a carbon recovery hose connected to a carbon black discharge part of the carbon black conveying module at a gap to introduce external air, a carbon black recovery silo connected to the carbon recovery hose to recover and store the carbon black; a carbon black collection blower for sucking the carbon black into the carbon black recovery silo through the carbon recovery hose, such that a vacuum pressure (negative pressure) is formed inside the carbon black recovery silo, and the carbon black is collected by a suction supply scheme while the external air is sucked through the gap; and a back filter for filtering out a foreign substance inside the carbon black recovery silo.

In addition, according to the device for the continuous low-temperature pyrolysis of the present invention, the carbon black recovery module may further include an actuator for controlling the gap.

In addition, an ejector having a venturi structure may be installed between the carbon black discharge part and the carbon recovery hose to rapidly discharge the carbon black.

In addition, according to the present invention, the device for the continuous low-temperature pyrolysis may further include a pyrolysis reactor cleaning module for cleaning an inside of a pyrolysis reactor of the pyrolysis module.

In addition, the pyrolysis reactor cleaning module may include:
   a pyrolysis reactor opening stopper unit provided to open and close an opening formed at both ends of the pyrolysis reactor; a cleaning rod input into the pyrolysis reactor through the opening when cleaning an inside of the pyrolysis reactor, and including a plurality of cleaning liquid spray nozzles; and a cleaning liquid high-pressure spray unit for spraying a cleaning liquid at a high pressure through the cleaning liquid spray nozzle.

A bearing for rotatably supporting the cleaning rod may be installed at both ends of the cleaning rod, and the cleaning rod may be installed so as to be rotatable by a driving motor.

Meanwhile, according to the present invention, there is provided a method for continuous low-temperature pyrolysis, which continuously supplies a waste tire chip, performs low-temperature pyrolysis to generate carbon black and a pyrolysis gas, and condenses the pyrolysis gas to generate oil, wherein: a waste tire chip is continuously supplied by a pneumatic method of an intake method and a blowing method, such that a waste tire chip supply blower is driven to re-suck air from a back filter module, and blow and feed the waste tire chip together with the sucked air into a waste tire chip silo, and the air inside the waste tire chip silo is sucked and removed to supply only the waste tire chip into a pyrolysis reactor and block introduction of the air; and
   a plurality of waste tire chip silos 120 are installed in a parallel structure, such that a silo selection valve installed in a lower portion of the waste tire chip silo opens and closes a waste tire supply line so as to be opened only toward one waste tire chip silo that requires supply of the waste tire chip among the waste tire chip silos, so that the waste tire chip is continuously input into the pyrolysis reactor.

In addition, according to the method for the continuous low-temperature pyrolysis of the present invention, a carbon recovery hose may be connected to a carbon black discharge part of a carbon black conveying module at a gap to recover and store the carbon black, and a carbon black collection blower may be driven to suck the carbon black into a carbon black recovery silo through the carbon recovery hose, such that a vacuum pressure may be formed inside the carbon black recovery silo, and the carbon black may be collected by a suction supply scheme while the external air is sucked through the gap.

Advantageous Effects

As described above, the present invention may have the following effects.

First, waste tire chips may be continuously supplied, such that a pneumatic method of an intake method and a blowing method may be adopted to rapidly feed (supply) the waste tire chips by a simple scheme and supply only the waste tire chips into a pyrolysis reactor while introduction of air is fundamentally blocked, so that pyrolysis efficiency of the pyrolysis reactor can be increased, and an explosive reaction can be prevented; and unlike the related art, a mechanical conveyor supply scheme may not be used, so that a waste tire chip supply facility can be miniaturized and modularized, which enables a compact design of a pyrolysis facility, a pyrolysis operation can be facilitated, maintenance and repair can be facilitated, and a site area of the pyrolysis facility, a cost of manpower input for supplying the waste tire chips, or the like can be significantly reduced.

Second, a plurality of waste tire chip silos may be installed in a parallel structure, such that a waste tire supply line may be opened and closed so as to be opened only toward one waste tire chip silo that requires supply of the waste tire chip among the waste tire chip silos by a control of a silo selection valve installed in a lower portion of the waste tire chip silo, so that the waste tire chip can be continuously input (supplied) into the pyrolysis reactor.

Third, a condensing module for condensing a pyrolysis gas to generate oil may form an oil film while spraying oil upward into a condensing chamber to expand a contact area between the pyrolysis gas, which has a relatively high temperature, and the oil film, so that condensation efficiency of the pyrolysis gas can be increased, and the oil may be sprayed at a high pressure toward the pyrolysis gas to collect a foreign substance included in the pyrolysis gas and allow the foreign substance to be dropped downward, so that high-quality oil can be extracted.

Fourth, carbon black may be recovered into a recovery silo by a suction supply scheme, such that a vacuum pressure (negative pressure) may be formed inside the carbon black recovery silo, and the carbon black may be rapidly collected by the suction supply scheme while external air is sucked through a gap, so that recovery efficiency of the carbon black can be improved; and unlike the related art, a mechanical conveyor recovery scheme may be not used, so that a carbon black recovery facility can be miniaturized and modularized, which enables a compact design of a pyrolysis facility, a pyrolysis operation can be facilitated, maintenance and repair can be facilitated, and a site area of the pyrolysis facility, a cost of manpower input for recovering the carbon black, or the like can be significantly reduced.

Fifth, while installing a screw shaft inside a pyrolysis reactor of a pyrolysis module, the screw shaft may be arranged eccentrically with respect to a center of the pyrolysis reactor, so that clogging of a waste tire chip can be effectively prevented, and a pyrolysis reactor cleaning module may be provided so that an inside of the pyrolysis reactor can be efficiently cleaned after pyrolysis is completed.

Effects of the present invention are not limited to the effects described above, and other effects that are not described above will be clearly understood by those skilled in the art from the description of the claims.

BEST MODE

Hereinafter, an exemplary embodiment of the present invention will be described in detail with reference to the accompanying drawings so that a person having ordinary skill in the art to which the present invention pertains may easily implement the present invention.

While describing the present embodiment, the terms such as 'first' and 'second' may be used to describe various elements, but the elements are not limited by the terms. The terms are used only to distinguish one element from another element. In addition, the term such as 'unit', 'module', or 'means' described herein refers to a unit for processing at least one function or operation.

Figure 1:
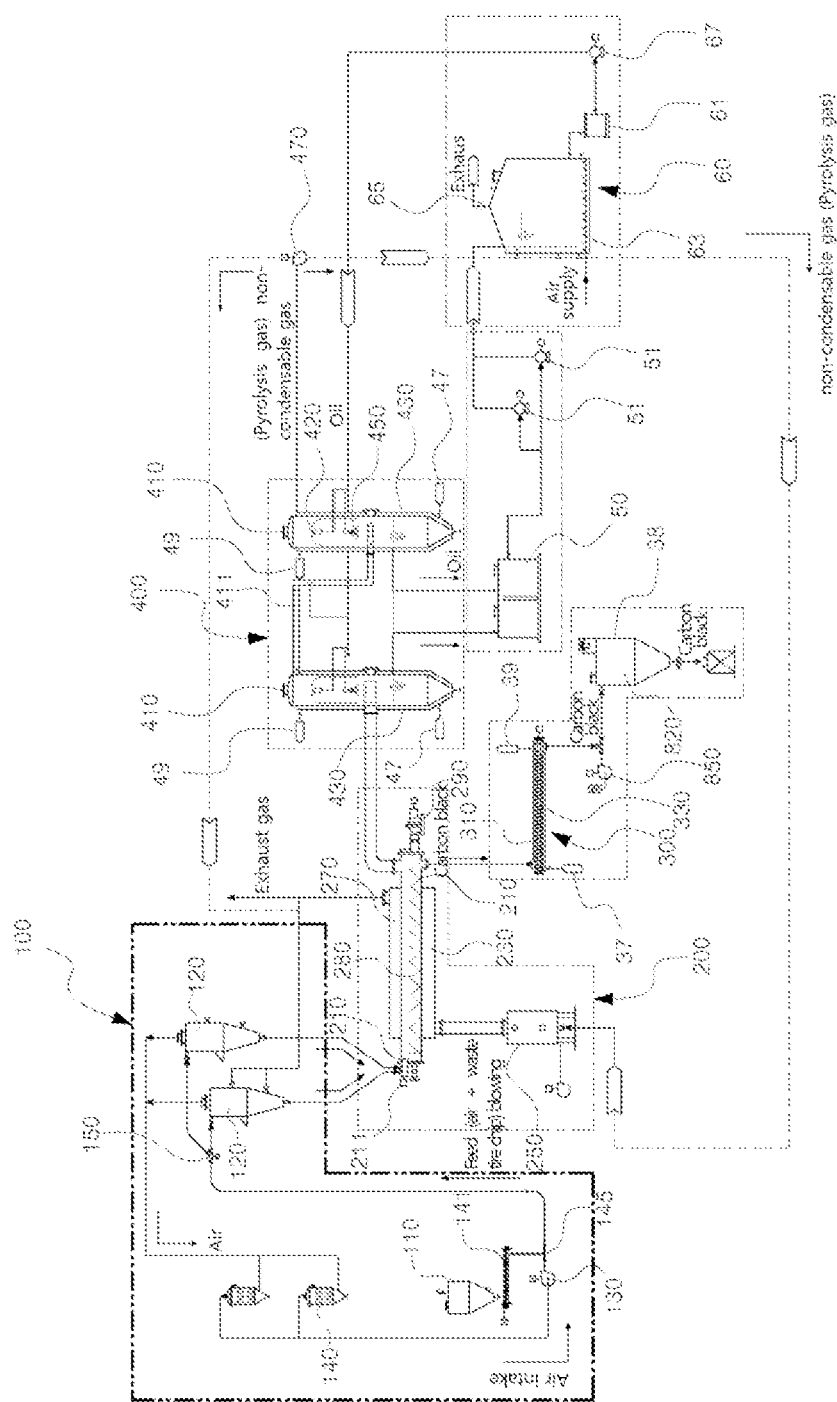
FIG. 1 is a view showing an overall configuration of a device for continuous low-temperature pyrolysis according to an exemplary embodiment of the present invention.
Figure 2:
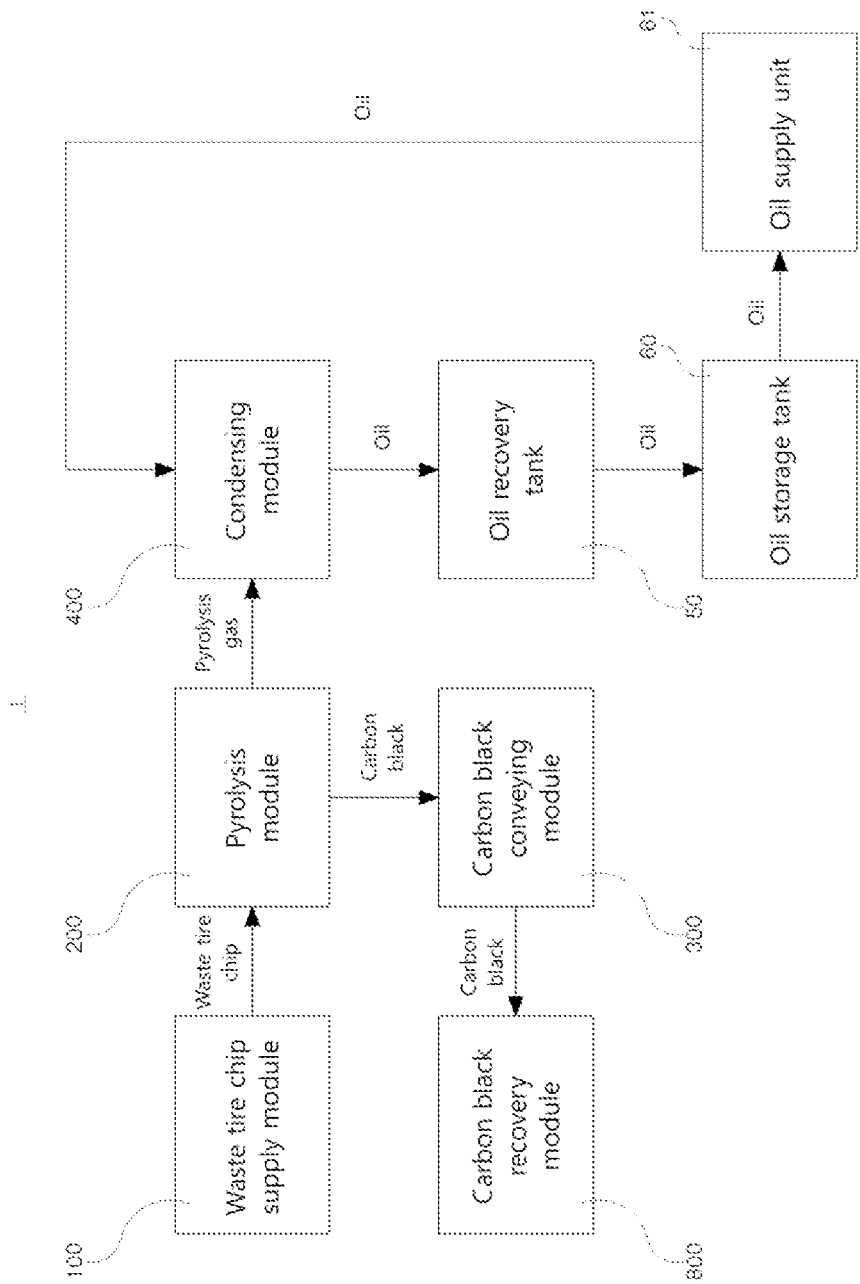
FIG. 2 is a conceptual diagram showing the overall configuration of the device for the continuous low-temperature pyrolysis according to the exemplary embodiment of the present invention.
Figure 3:
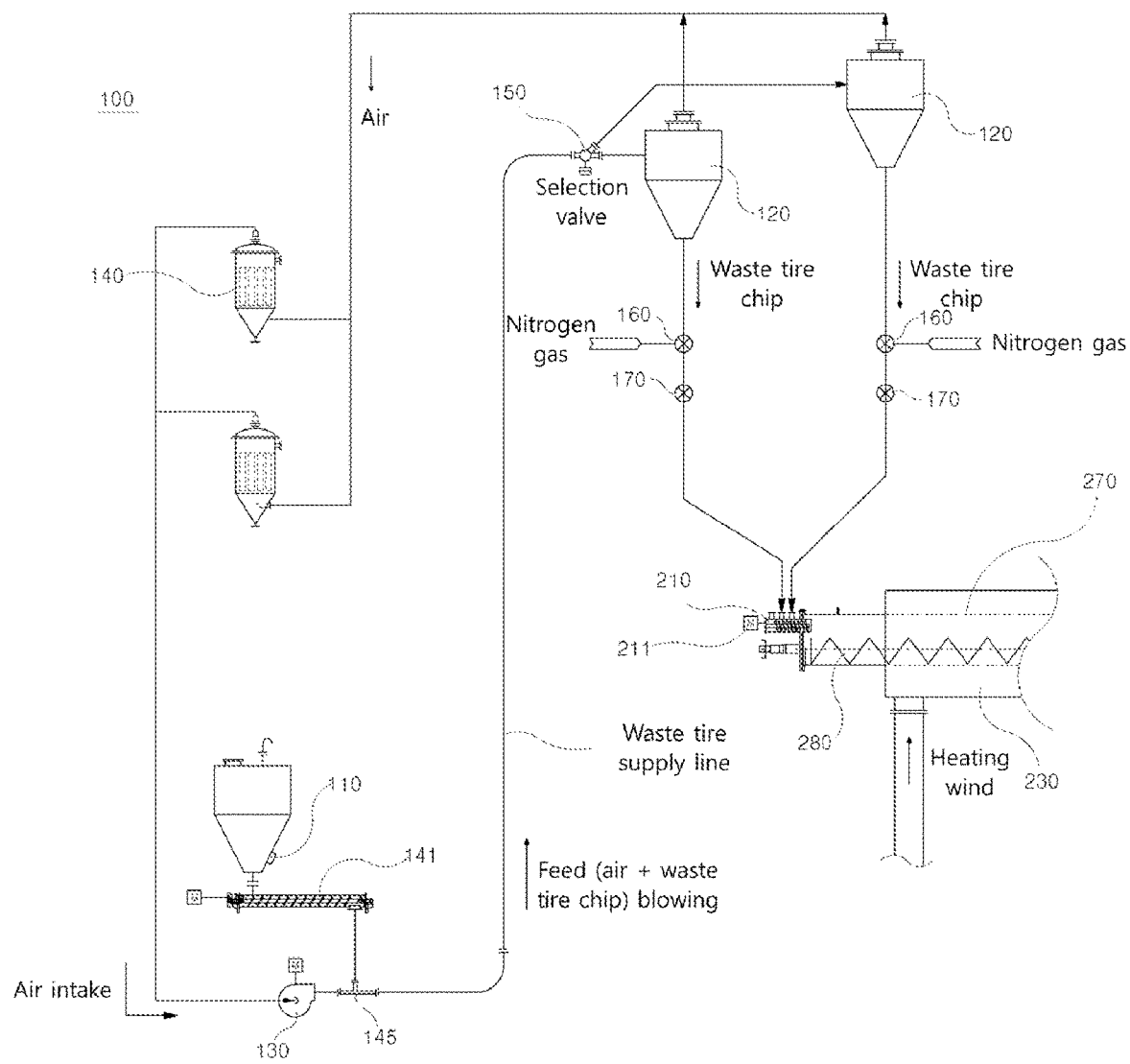
FIG. 3 is a view showing a configuration of a waste tire chip supply module in the device for the continuous low-temperature pyrolysis according to the exemplary embodiment of the present invention.
Figure 4:
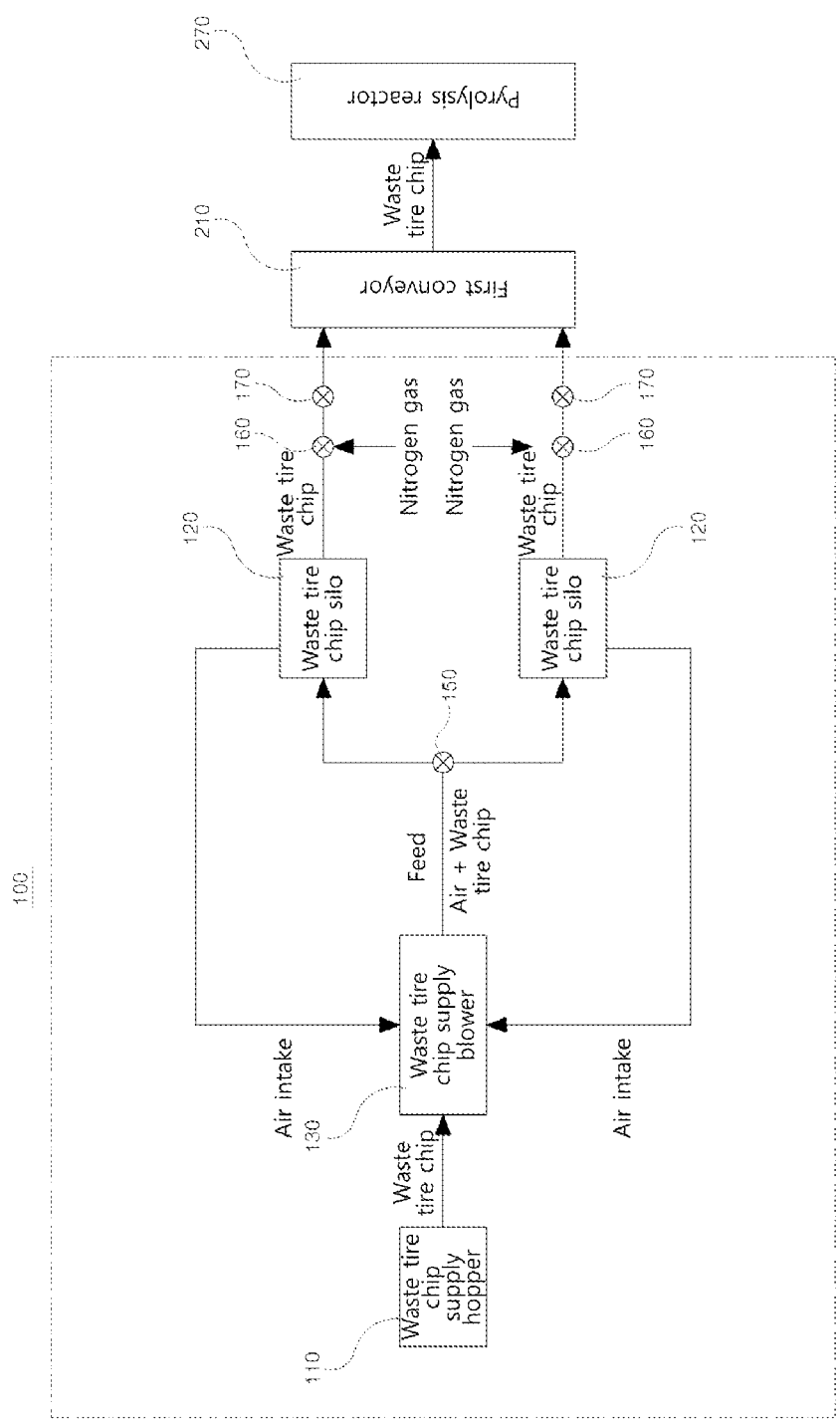
FIG. 4 is a conceptual diagram showing the configuration of the waste tire chip supply module of FIG. 3.
Figure 5:
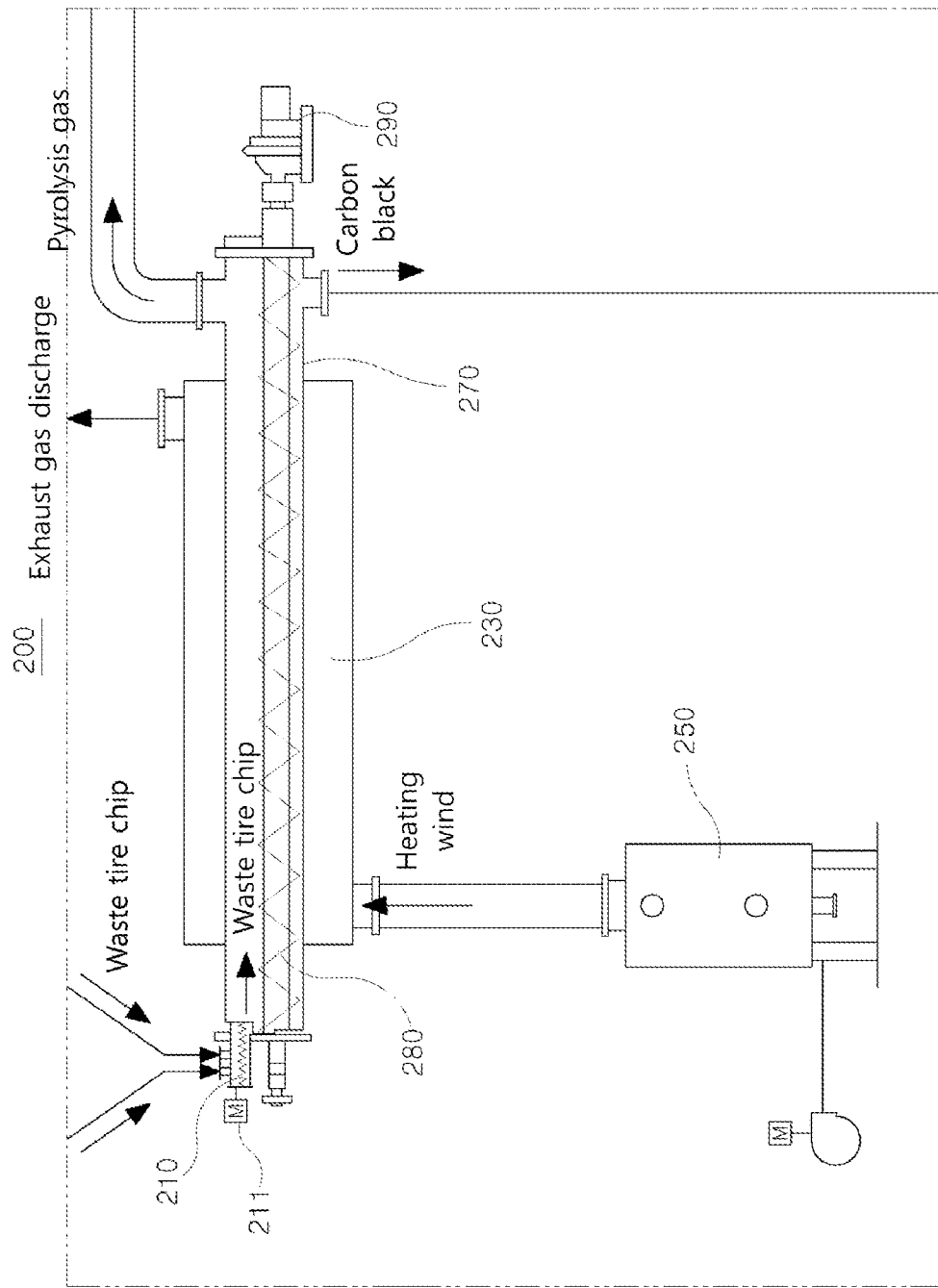
FIG. 5 is a view showing a configuration of a pyrolysis module in the device for the continuous low-temperature pyrolysis according to the exemplary embodiment of the present invention.
Figure 6:
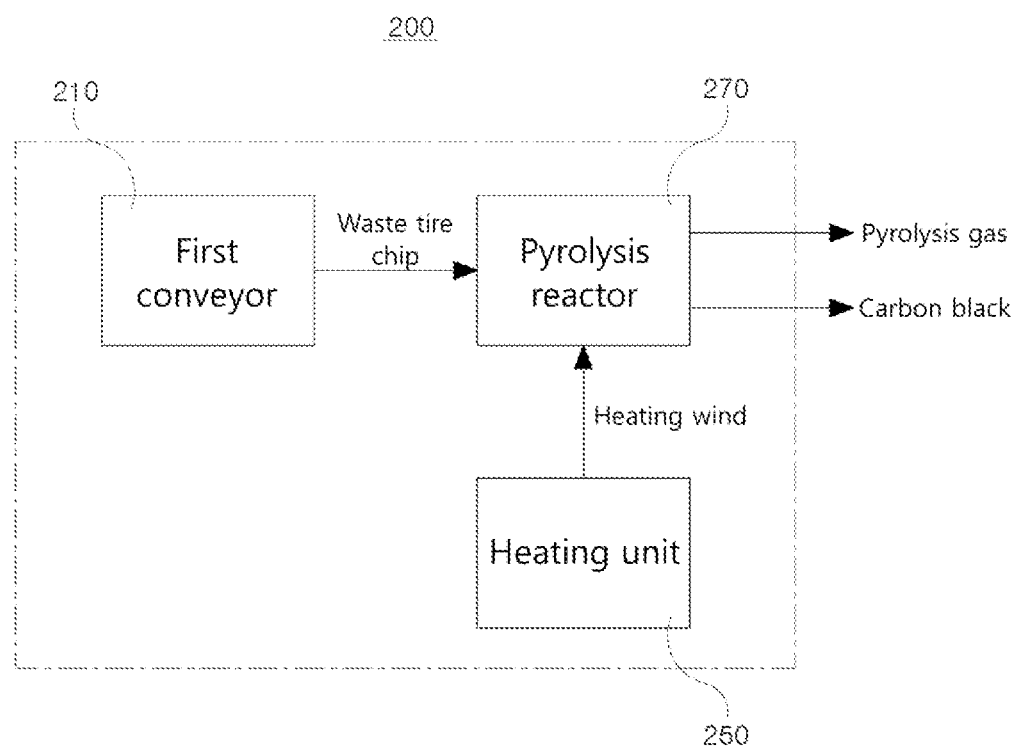
FIG. 6 is a conceptual diagram showing the pyrolysis module in the device for the continuous low-temperature pyrolysis according to the exemplary embodiment of the present invention.

FIG. 1 is a view showing an overall configuration of a device for continuous low-temperature pyrolysis according to an exemplary embodiment of the present invention, FIG. 2 is a conceptual diagram showing the overall configuration of the device for the continuous low-temperature pyrolysis according to the exemplary embodiment of the present invention, FIG. 3 is a view showing a configuration of a waste tire chip supply module in the device for the continuous low-temperature pyrolysis according to the exemplary embodiment of the present invention, FIG. 4 is a conceptual diagram showing the configuration of the waste tire chip supply module of FIG. 3, FIG. 5 is a view showing a configuration of a pyrolysis module in the device for the continuous low-temperature pyrolysis according to the exemplary embodiment of the present invention, and FIG. 6 is a conceptual diagram showing the pyrolysis module in the device for the continuous low-temperature pyrolysis according to the exemplary embodiment of the present invention.

Figure 7:
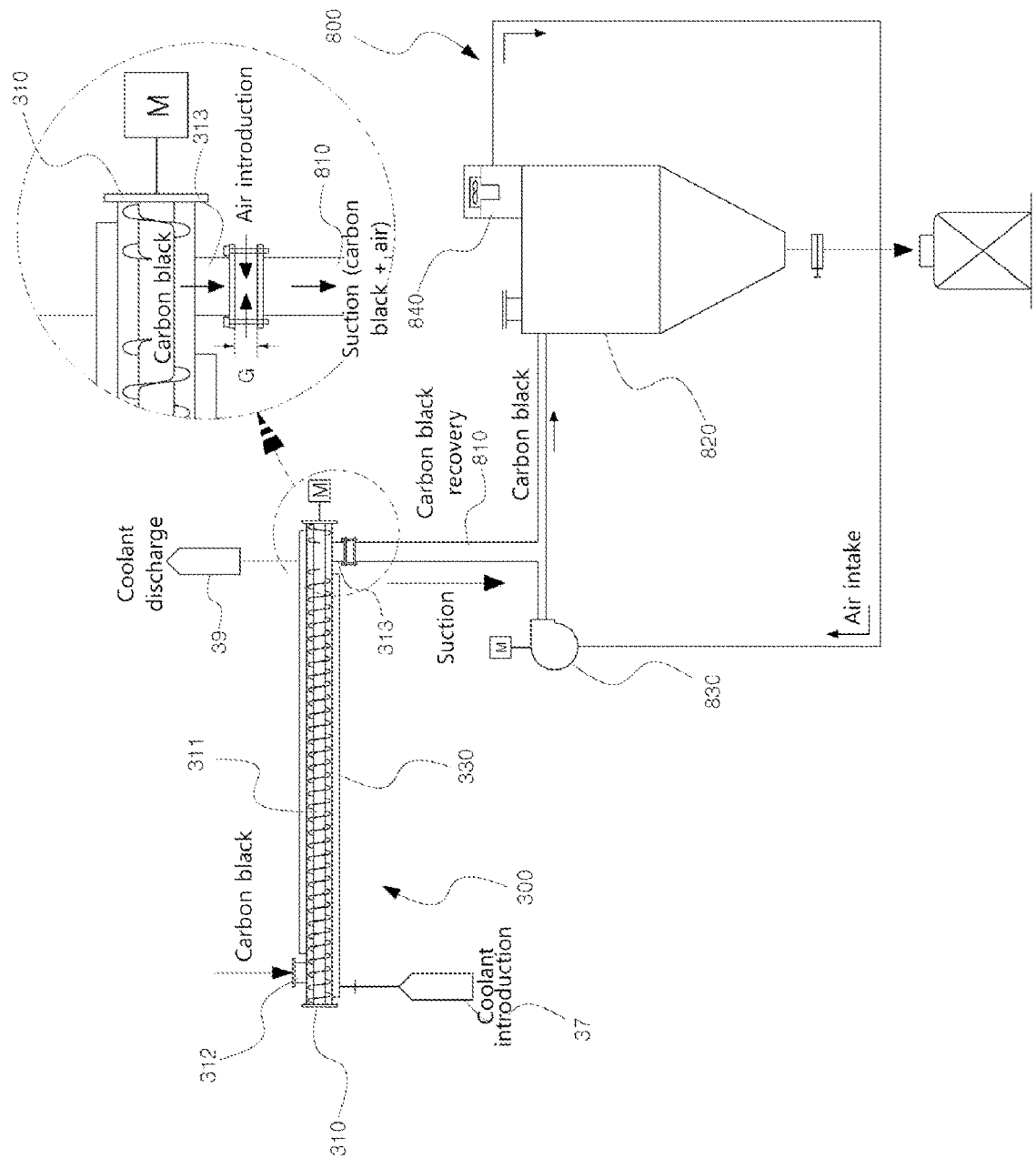
FIG. 7 is a view showing configurations of a carbon black conveying module and a carbon black recovery module according to the present invention.
Figure 8:
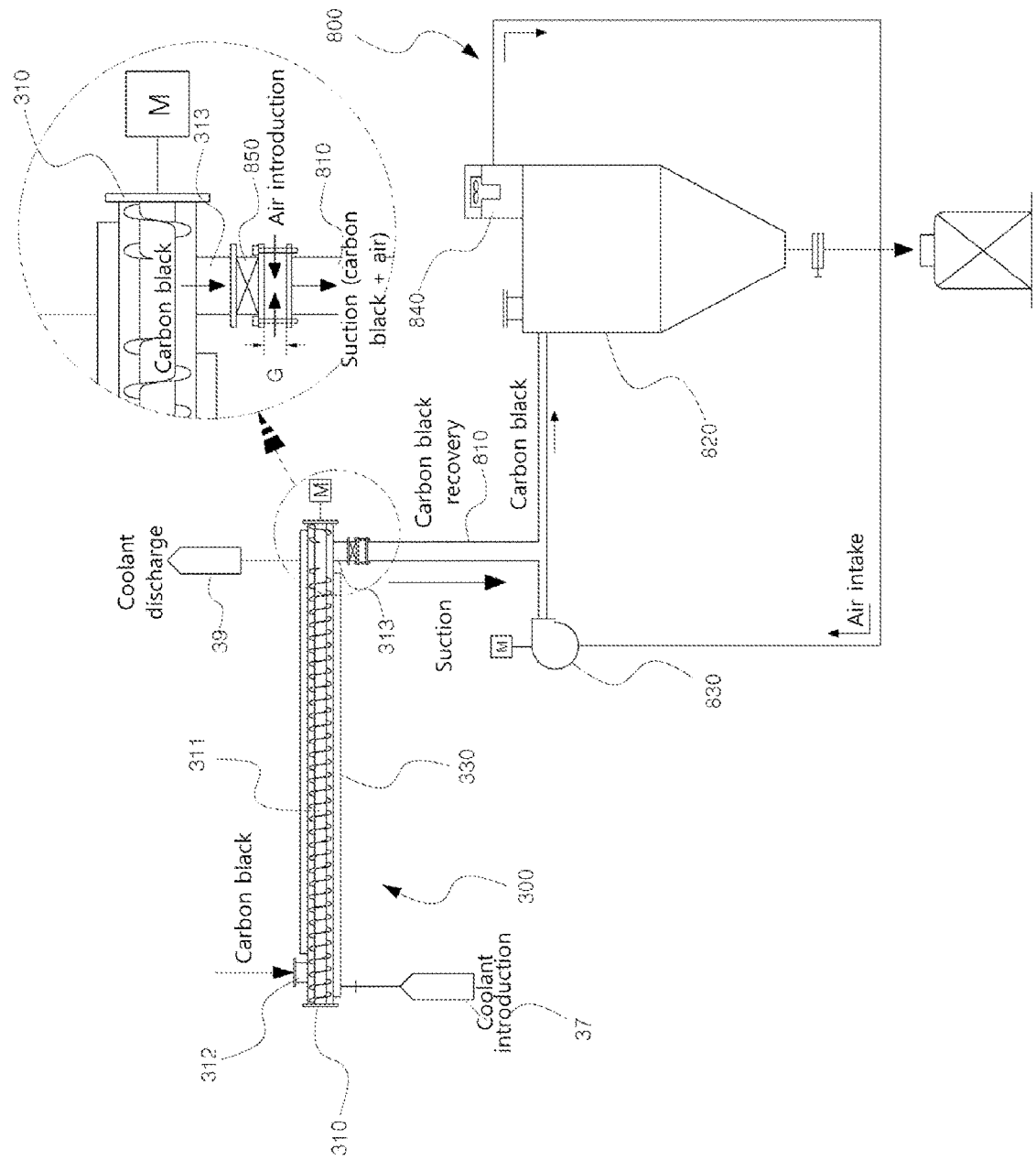
FIG. 8 is a view showing a configuration of a carbon black recovery module according to another embodiment of the present invention.
Figure 9:
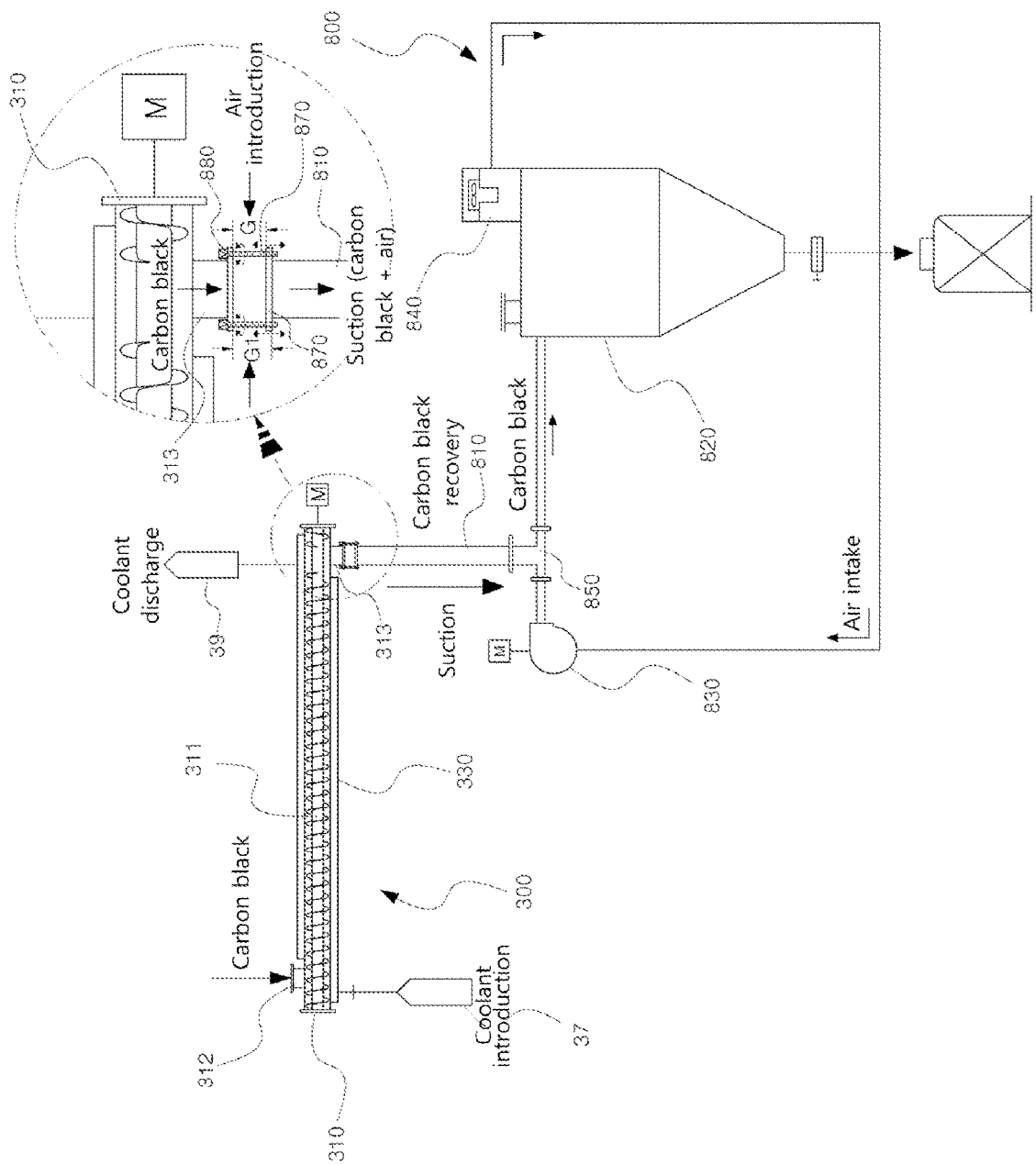
FIG. 9 is a view showing a configuration of a carbon black recovery module according to still another embodiment of the present invention.

FIG. 7 is a view showing configurations of a carbon black conveying module and a carbon black recovery module according to the present invention, FIG. 8 is a view showing a configuration of a carbon black recovery module according to another embodiment of the present invention, and FIG. 9 is a view showing a configuration of a carbon black recovery module according to still another embodiment of the present invention.

Figure 10:
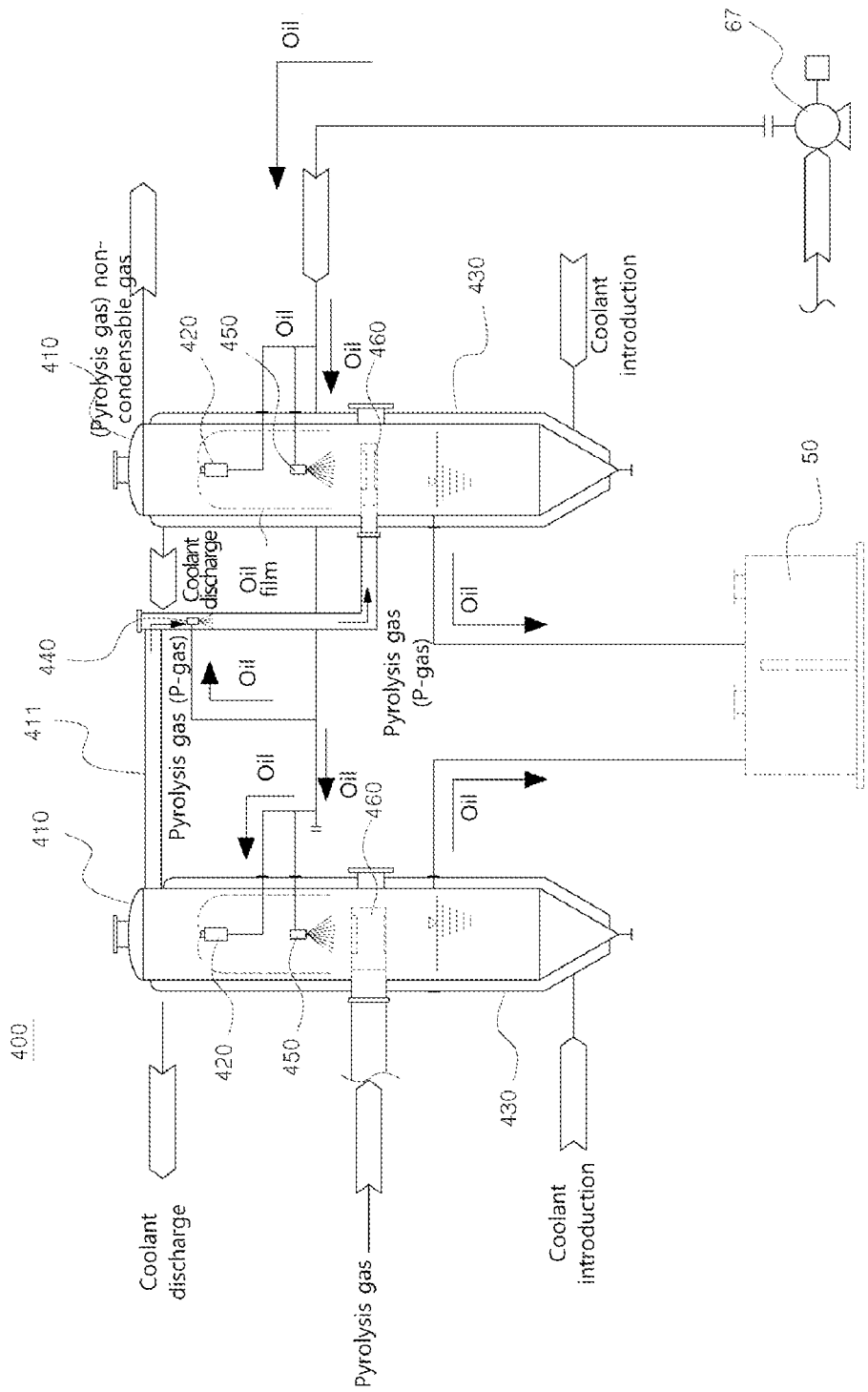
FIG. 10 is a view showing a configuration of a condensing module in the device for the continuous low-temperature pyrolysis according to the exemplary embodiment of the present invention.
Figure 11:
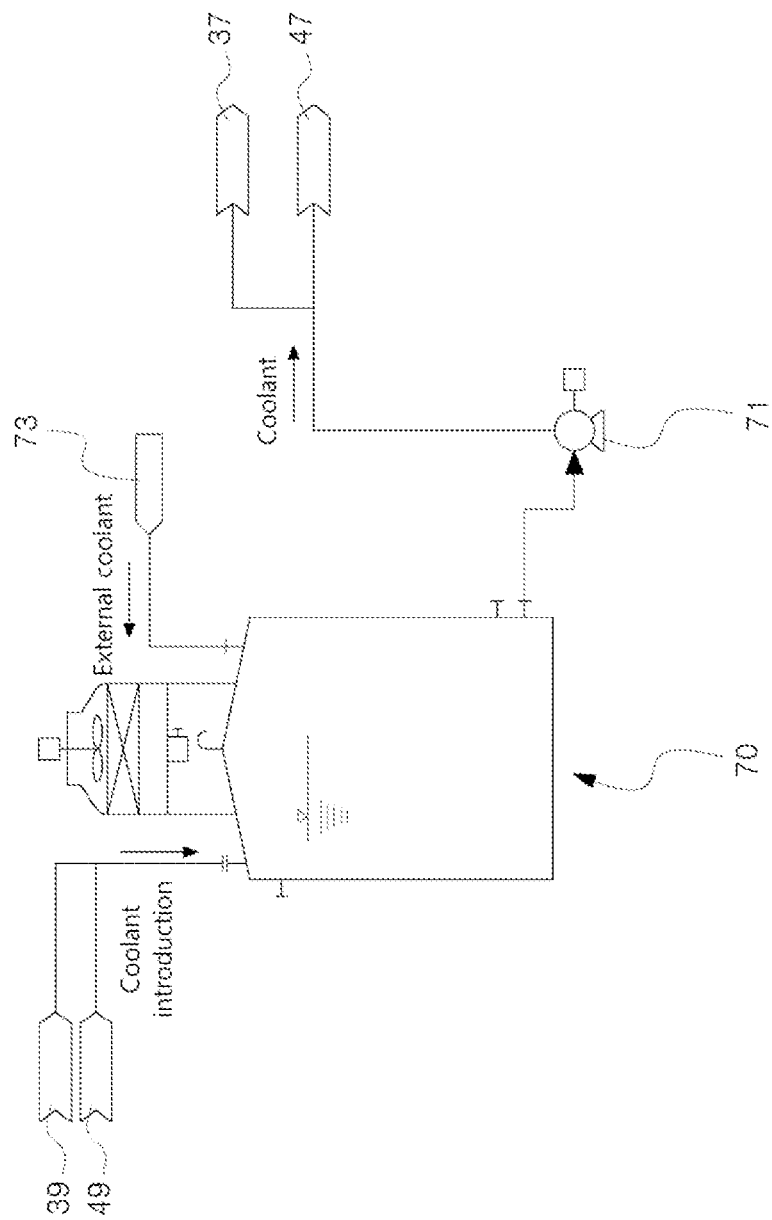
FIG. 11 is a view showing a configuration of a coolant supply tank in the device for the continuous low-temperature pyrolysis according to the exemplary embodiment of the present invention.
Figure 12:
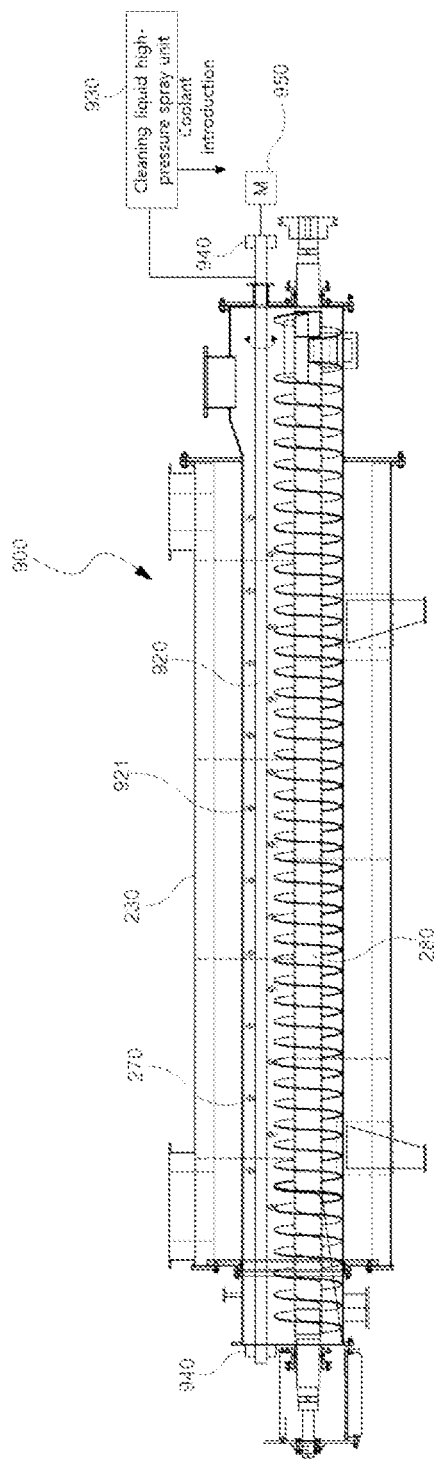
FIG. 12 is a view showing a configuration of a pyrolysis reaction furnace cleaning module in the device for the continuous low-temperature pyrolysis according to the exemplary embodiment of the present invention.
Figure 13:
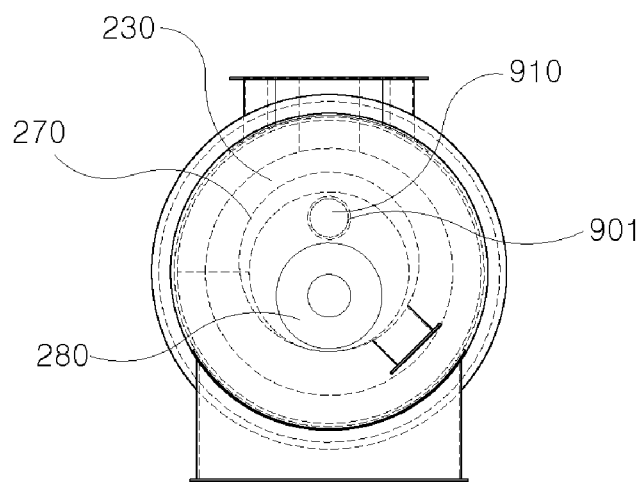
FIG. 13 is a side view showing an eccentric arrangement of the pyrolysis reactor cleaning module and a screw shaft in the device for the continuous low-temperature pyrolysis according to the exemplary embodiment of the present invention.

In addition, FIG. 10 is a view showing a configuration of a condensing module in the device for the continuous low-temperature pyrolysis according to the exemplary embodiment of the present invention, FIG. 11 is a view showing a configuration of a coolant supply tank in the device for the continuous low-temperature pyrolysis according to the exemplary embodiment of the present invention, FIG. 12 is a view showing a configuration of a pyrolysis reaction furnace cleaning module in the device for the continuous low-temperature pyrolysis according to the exemplary embodiment of the present invention, and FIG. 13 is a side view showing an eccentric arrangement of the pyrolysis reactor cleaning module and a screw shaft in the device for the continuous low-temperature pyrolysis according to the exemplary embodiment of the present invention.

Hereinafter, a device and a method for continuous low-temperature pyrolysis according to the present invention will be described with reference to the accompanying drawings.

The device for the continuous low-temperature pyrolysis according to the present invention may be a device that continuously pyrolyzes a raw material (e.g., a waste tire chip) to generate carbon black and a pyrolysis gas, which are by-products, and condenses the pyrolysis gas to generate oil, and the low-temperature pyrolysis may refer to a process of decomposing an environmental pollutant such as a waste tire or waste plastic by a low-temperature indirect heating scheme at about 500° C. to generate energy such as a pyrolysis gas or oil capable of replacing fossil fuel, and extracting carbon black, which is a by-product.

The device for the low-temperature pyrolysis according to the present invention may be set to 1 day (24 H), 3 days, 5 days, 7 days, and the like to perform an automatic continuous operation, and may be modularized.

Modularization may refer to a method for manufacturing a product by dividing the product into parts (units or modules) in a manufacturing plant or the like, and reassembling the parts on site. According to the present invention, modules may be reassembled on site to install the device for the low-temperature pyrolysis, a plurality of devices for low-temperature pyrolysis may be connected to each other to operate, a construction period may be shortened, and installation and operating costs may be significantly reduced.

A pyrolysis raw material according to the present invention is not limited to a waste tire chip, and plastic, vinyl, or the like may also be used as a raw material. The waste tire chip used in the present invention may refer to a piece of a waste tire obtained by crushing and cutting the waste tire to a predetermined size.

As shown in FIGS. 1 to 13, according to the present invention, the device 1 for the continuous low-temperature pyrolysis may include: a waste tire chip supply module 100 for supplying a waste tire chip by an intake method and a blowing method; a pyrolysis module 200 for pyrolyzing the waste tire chip to generate carbon black and a pyrolysis gas (including oil); a carbon black conveying module 300 for conveying the carbon black to an outside of the pyrolysis module 200; a carbon black recovery module 800 for conveying and storing the carbon black into a carbon black storage tank 38; a condensing module 400 for condensing the pyrolysis gas to generate oil; and an oil recovery tank 50 for recovering the oil.

Hereinafter, elements of the device 1 for the continuous low-temperature pyrolysis according to the present invention will be reviewed in detail.

First, referring to FIGS. 1 to 4, the waste tire chip supply module 100 may continuously supply the waste tire chip, such that the waste tire chip is supplied by a pneumatic method of an intake method and a blowing method.

According to the waste tire chip supply module 100, waste tire chips may be continuously supplied, such that a pneumatic method may be adopted to rapidly feed (supply) the waste tire chips by a simple scheme and supply only the waste tire chips into a pyrolysis reactor while introduction of air is fundamentally blocked, so that pyrolysis efficiency of the pyrolysis reactor may be increased, and an explosive reaction may be prevented; and unlike the related art, a mechanical conveyor supply scheme may not be used, so that a waste tire chip supply facility may be miniaturized and modularized, which enables a compact design of a pyrolysis facility, a pyrolysis operation may be facilitated, maintenance and repair may be facilitated, and a site area of the pyrolysis facility, a cost of manpower input for supplying the waste tire chips, or the like may be significantly reduced.

When reviewing a configuration of the waste tire chip supply module 100, the waste tire chip supply module 100 may include: a waste tire chip supply hopper 110 for inputting the waste tire chip into a pyrolysis reactor 270 of the pyrolysis module 200; a plurality of waste tire chip silos 120 for temporarily storing the waste tire chip supplied from the waste tire chip supply hopper 110, and inputting (supplying) the waste tire chip into a first conveyor 210 of the pyrolysis module 200 by a free fall scheme; a silo selection valve 150 for supplying the waste tire chip by alternately selecting the waste tire chip silos 120 so that the waste tire chip is continuously supplied into the first conveyor 210; a back filter module 140 for collecting and filtering out a foreign substance introduced into the waste tire chip silo 120; and a waste tire chip supply blower 130 for sucking air introduced into the waste tire chip silo 120, and blowing the waste tire chip together with the air into the waste tire chip silo 120 to supply the waste tire chip and the air by a feeding scheme.

A waste tire chip conveying screw conveyor 141 may be installed in a lower portion of the waste tire chip supply hopper 110, and the waste tire chip conveyed by the waste tire chip conveying screw conveyor 141 may be conveyed to the waste tire chip silo 120 along a waste tire chip supply line by feeding of the waste tire chip supply blower 130. An ejector 145 having a venturi structure may be further installed on an outlet side of the waste tire chip supply blower 130, so that the waste tire chip may be fed more rapidly.

Since the ejector 145 has the venturi structure, a speed of feeding the waste tire chip on the outlet side may be increased, so that a speed of supplying the waste tire chip may be further increased.

As described above, according to conventional pyrolysis devices and methods, while supplying waste tire chips, since a batch scheme is used, it may be difficult to continuously supply the waste tire chips, and air may be introduced into a pyrolysis reactor together with the waste tire chips, so that pyrolysis efficiency of the pyrolysis reactor may be significantly reduced, and there is a risk of explosion during a pyrolysis reaction. However, according to the present invention, waste tire chips may be continuously supplied by a pneumatic method of an intake method and a blowing method, such that only the waste tire chips may be supplied into a pyrolysis reactor 270 while introduction of air is fundamentally blocked, so that pyrolysis efficiency of the pyrolysis reactor 270 may be increased, an explosive reaction may be effectively prevented, and a continuous operation may be enabled.

According to the technical feature of the waste tire chip supply module 100, the waste tire chip supply blower 130 may be driven to re-suck air from the waste tire chip silo 120, and feed the waste tire chips together with the sucked air into the waste tire chip silo 120 by the pneumatic method, and the air inside the waste tire chip silo 120 may be sucked and removed to supply only the waste tire chips into the pyrolysis reactor 270 and fundamentally block introduction of the air. In this case, the back filter module 140 may serve to filter out a foreign substance so that the foreign substance may not be introduced into the waste tire chip silo 120.

In addition, the silo selection valve 150 (opening/closing valve) may open and close the waste tire chip supply line so as to be opened only toward the waste tire chip silo 120 that requires supply of the waste tire chip among the waste tire chip silos 120 installed in parallel, so that the waste tire chip may be continuously input into the pyrolysis reactor 270.

A waste tire chip supply blocking unit 170 may be installed in a lower portion of the waste tire chip silo 120 to selectively supply or block the waste tire chip into the pyrolysis reactor 270. In this case, the waste tire chip supply blocking unit 170 may be configured as, for example, a ball valve type.

The waste tire chips may be controlled to be selectively supplied or blocked into the pyrolysis reactor 270 by the waste tire chip supply blocking unit 170 and the silo selection valve 150 (opening/closing valve).

In addition, the waste tire chips that are cut and crushed to the predetermined size may be stored inside the waste tire chip supply hopper 110, and the waste tire chips may be conveyed along the waste tire chip supply line to pass through the waste tire chip silo 120 so as to be introduced into the first conveyor 210. Next, the first conveyor 210 may be rotated by a motor 211 to input (supply) the waste tire chips into the pyrolysis reactor 270.

A nitrogen gas supply unit 160 for supplying a nitrogen gas (N2) may be installed in the lower portion of the waste tire chip silo 120 to prevent an explosive reaction caused by the introduction of the air into the pyrolysis reactor 270 of the pyrolysis module 200.

The nitrogen gas supply unit 160 may introduce the nitrogen gas into the pyrolysis reactor 270 to block the introduction of the air, so that a negligent accident according to the explosive reaction may be effectively prevented.

In addition, as shown in FIGS. 5 and 6, according to the present invention, the pyrolysis module 200 may pyrolyze the waste tire chip supplied from the waste tire chip supply module 100 to generate (extract) the pyrolysis gas (containing the oil) and the carbon black.

A waste tire may be formed of natural rubber, synthetic rubber, carbon black, steel (iron core), oil, and other additives. The pyrolysis module 200 may indirectly heat the waste tire to pyrolyze the waste tire, so that the carbon black and the pyrolysis gas (including the oil), which are by-products, may be generated. In this case, a pyrolysis temperature may be within a range of 400° C. to 600° C., but is not necessarily limited thereto.

When reviewing a configuration of the pyrolysis module 200, the pyrolysis module 200 may include: a pyrolysis reactor 270 for accommodating the waste tire chip supplied from the waste tire chip supply module 100; a screw shaft 280 rotatably installed inside the pyrolysis reactor 270 to stir and convey the waste tire chip accommodated in the pyrolysis reactor 270, such that the screw shaft 280 is installed eccentrically with respect to a center of the pyrolysis reactor 270 to prevent clogging of the waste tire chip; a screw shaft driving motor unit 290 for rotating the screw shaft 280; a first conveyor 210 connected to one side of the pyrolysis reactor 270 to input the waste tire chip into the pyrolysis reactor 270; a heating jacket 230 installed on an outer periphery of the pyrolysis reactor 270 to heat the outer periphery of the pyrolysis reactor 270 to pyrolyze the waste tire chip; and a heating unit 250 for supplying heat into the heating jacket 230.

As the screw shaft driving motor unit 290 is driven to rotate the screw shaft 280, the waste tire chip accommodated in the pyrolysis reactor 270 may be stirred and conveyed, and may be subjected to a pyrolysis reaction by a heating wind introduced into the heating jacket 230. The screw shaft 280 may be installed eccentrically with respect to the center of the pyrolysis reactor 270 to prevent the clogging of the waste tire chip (see FIG. 13).

The heating unit 250 may be configured as a gas burner, a heating wind stove, or the like, and the heating jacket 230 may be heated to a temperature of about 1000° C.

An LPG may be used as a raw material at the beginning of the pyrolysis operation, and a part of the pyrolysis gas (non-condensable gas) may be bypassed and reused as fuel during the pyrolysis operation. The non-condensable gas may refer to a non-condensable gas (exhaust gas) that is not condensed after passing through the condensing module 400.

In addition, referring to FIGS. 1 and 7, the carbon black conveying module 300 may convey the carbon black generated by the pyrolysis module 200 to the outside of the pyrolysis module 200.

When reviewing a configuration of the carbon black conveying module 300, the carbon black conveying module 300 may include: a second conveyor 310 including a screw conveyor 311 for conveying the carbon black generated by a pyrolysis reactor 270 of the pyrolysis module 200 to an outside of the pyrolysis reactor 270, and having one side formed with a carbon black introduction part 312 for introducing the carbon black and an opposite side formed with a carbon black discharge part 313 for discharging the carbon black; and a first cooling jacket 330 connected to a coolant supply tank 70 (shown in FIG. 11) for supplying a coolant, and installed on an outer periphery of the second conveyor 310 to cool the carbon black conveyed from the second conveyor 310.

When the carbon black generated through the pyrolysis reaction is introduced through the carbon black introduction part 312, the second conveyor 310 may rotate to convey the carbon black, and discharge the carbon black to the outside through the carbon black discharge part 313.

A movement pipe (not shown) through which a heat medium (refrigerant) moves may be formed inside the first cooling jacket 330, and the heat medium may be a fluid used to maintain an inner space of the second conveyor 310 at a constant temperature, which cools the carbon black while being supplied to the movement pipe (not shown) by the coolant supply tank 70 and moving through the inner space of the second conveyor 310. The carbon black conveyed by the second conveyor 310 may be preferably cooled to a temperature of about 80° C., which is for the purpose of preventing spontaneous combustion of the carbon black because there is a risk of the spontaneous combustion of the carbon black when the carbon black is stored inside a carbon black recovery silo 820, which will be described below.

The first cooling jacket 330 may have one end provided with a first coolant supply unit 37 and an opposite end provided with a first coolant recovery unit 39, the coolant may be supplied to the first coolant supply unit 37 through the coolant supply tank 70 shown in FIG. 11, the supplied coolant may cool an inside of the second conveyor while flowing along the movement pipe (not shown) of the first cooling jacket 330, and the coolant having a temperature increased due to heat exchange during the cooling may be introduced back into the coolant supply tank 70 through the first coolant recovery unit 39 so as to be recirculated.

In addition, as shown in FIG. 7, the carbon black recovery module 800 may convey and store the carbon black conveyed by the carbon black conveying module 300 into the carbon black recovery silo 820.

In general, due to the nature of a continuous pyrolysis device, a connection portion between a pyrolysis reactor and a carbon black recovery facility is inevitably configured to have an open structure. According to a conventional pyrolysis device, a mechanical conveyor scheme may be used, so that in order to prevent external air from being introduced into a pyrolysis reactor due to the open structure, a separate air introduction prevention device is provided, or a size of a carbon black recovery facility is increased, and thus the pyrolysis device may not be miniaturized. However, according to the carbon black recovery module 800, carbon black may be recovered into a recovery silo by a suction supply scheme, such that a vacuum pressure (negative pressure) may be formed inside the carbon black recovery silo 820, and the carbon black may be rapidly collected by the suction supply scheme while external air is sucked through a gap G, so that recovery efficiency of the carbon black may be improved; and unlike the related art, a mechanical conveyor recovery scheme may be not used, so that a carbon black recovery facility may be miniaturized and modularized, which enables a compact design of a pyrolysis facility, a pyrolysis operation may be facilitated, maintenance and repair may be facilitated, and a site area of the pyrolysis facility, a cost of manpower input for recovering the carbon black, or the like may be significantly reduced.

When reviewing a configuration of the carbon black recovery module 800, the carbon black recovery module 800 may include: a carbon recovery hose 810 connected to a carbon black discharge part 313 of the carbon black conveying module 300 at a gap G to introduce external air; a carbon black recovery silo 820 connected to the carbon recovery hose 810 to recover and store the carbon black; a carbon black collection blower 830 for sucking the carbon black into the carbon black recovery silo 820 through the carbon recovery hose (or pipe) 810, such that a vacuum pressure (negative pressure) is formed inside the carbon black recovery silo 820, and the carbon black is collected by a suction supply scheme while the external air is sucked through the gap G; and a back filter 840 for filtering out a foreign substance inside the carbon black recovery silo 820.

The carbon black collection blower 830 may be driven to form the vacuum pressure (negative pressure) inside the carbon black recovery silo 820, and collect the carbon black by the suction supply scheme while the external air is sucked through the gap G, such that the carbon black discharged through the carbon black discharge part 313 of the carbon black conveying module 300 may be introduced into the carbon recovery hose 810 together with the air introduced through the gap G by a suction force, and conveyed into the carbon black recovery silo 820, and the back filter 840 may serve to filter out the foreign substance inside the carbon black recovery silo 820. Although not shown in the drawings, a filter net may be preferably installed in the gap G to prevent a foreign substance from being introduced when the external air is sucked.

As described above, the external air has to be prevented from being introduced into the pyrolysis reactor 270 through the carbon black discharge part 313 so as to prevent an explosive reaction from occurring. Due to an error in the pyrolysis operation or a failure of the carbon black collection blower 830 or the like, a serious problem in which the external air flows back into the pyrolysis reactor 270 through the gap G may occur. According to the present invention, in order to prevent such backflow of the external air, the screw conveyor (or conveying screw) may be installed inside the carbon black discharge part 313, and a rotary valve may be installed in a lower portion of the screw conveyor. The screw conveyor (or conveying screw) may facilitate discharge of the carbon black, and effectively prevent the backflow of the external air.

Further, as shown in FIG. 8, according to another embodiment of the present invention, the carbon black recovery module 800 may be configured such that an ejector 850 having a venturi structure is further installed between the carbon black discharge part 313 and the carbon recovery hose 810, so that the carbon black may be recovered more rapidly.

Since the ejector 850 has the venturi structure, a discharge speed of the carbon black may be increased on an outlet side, so that the recovery of the carbon black may be performed more smoothly.

Furthermore, as shown in FIG. 9, according to another embodiment of the present invention, the carbon black recovery module 800 may be configured such that the carbon black recovery module 800 further includes an actuator 880 for controlling the gap G.

A movable flange 870 may be formed in the carbon recovery hose 810, and a screw rod 881 of the actuator 880 may be coupled to the movable flange 870 in a screw structure, so that as the actuator 880 rotates the screw rod 881, the movable flange 870 may move up and down (in the drawings) to adjust a size of the gap G, in which a black carbon suction amount may be adjusted by adjusting an external air introduction amount while expanding or reducing the gap G by the control of the actuator 880, and thus the carbon black may be recovered more rapidly. In addition, the ejector 850 having the venturi structure may be further installed on an outlet side of the carbon black collection blower 830, so that the carbon black may be recovered more rapidly.

In addition, as shown in FIGS. 1 and 10, the condensing module 400 may condense the pyrolysis gas generated by the pyrolysis module 200 to extract (generate) the oil.

The condensing module 400 may include: at least one condensing chamber 410 for condensing the pyrolysis gas supplied from a pyrolysis reactor 270 of the pyrolysis module 200 to generate the oil; a second cooling jacket 430 connected to a coolant supply tank 70 (shown in FIG. 11) for supplying a coolant, and installed on an outer periphery of the condensing chamber 410 to cool and condense the pyrolysis gas; and a first oil spray nozzle 420 installed inside the condensing chamber 410 to form an oil film while spraying the oil supplied from an oil supply unit 61 upward, and a contact area between the pyrolysis gas, which has a relatively high temperature, and the oil film may be expanded to increase condensation efficiency of the pyrolysis gas.

The second cooling jacket 430 may be provided outside the condensing chamber 410, and the coolant may circulate inside the second cooling jacket 430 to cool and condense the pyrolysis gas introduced into the condensing chamber 410. In this case, a cooling temperature of the pyrolysis gas may be about 40° C.

The second cooling jacket 430 may have one end provided with a second coolant supply unit 47 and an opposite end provided with a second coolant recovery unit 49, the coolant may be supplied to the second coolant supply unit 47 through the coolant supply tank 70 shown in FIG. 11, the supplied coolant may cool the condensing chamber 410 while flowing along the movement pipe (not shown) inside the second cooling jacket 430, and the coolant having a temperature increased due to heat exchange may be introduced back into the coolant supply tank 70 through the second coolant recovery unit 49 so as to be circulated. The oil generated as the pyrolysis gas is condensed inside the condensing chamber 410 may be recovered into the oil recovery tank 50 through an oil recovery line formed in a lower portion of the condensing chamber 410.

The condensing module 400 may have multiple stages (plurality), which may be sequentially subjected to a condensation process, so that an oil recovery rate from the pyrolysis gas may be significantly improved. Although two stages have been described as one example according to the present embodiment, the present invention is not limited thereto.

In addition, when a plurality of condensing chambers 410 are provided, the condensing chambers 410 may be connected to each other by a connection pipe 411 so that the pyrolysis gas may be sequentially condensed in multiple stages, and a second oil spray nozzle 440 for spraying the oil supplied from the oil supply unit 61 (shown in FIG. 1) may be further installed inside the connection pipe 411 to rapidly cool the pyrolysis gas, so that condensation efficiency may be further increased.

A foreign substance removal nozzle 450 for spraying the oil at a high pressure toward the pyrolysis gas to collect a foreign substance included in the pyrolysis gas and allow the foreign substance to be dropped downward may be further installed inside the condensing chamber 410.

A foreign substance filter unit 460 for filtering out the foreign substance may be installed directly under the foreign substance removal nozzle 450. The foreign substance (e.g., dust, etc.) collected by the foreign substance removal nozzle 450 so as to be dropped may be filtered out by the foreign substance filter unit 460.

In addition, the coolant supply tank 70 shown in FIG. 11 may supply the coolant to the first cooling jacket 330 (shown in FIG. 7) and the second cooling jacket 430 (shown in FIG. 10).

To elaborate, the coolant supply tank 70 may store the coolant introduced through an external coolant supply unit 73, and supply the coolant to the first coolant supply unit 37 and the second coolant supply unit 47 through a water pump 71.

The coolant supplied from the coolant supply tank 70 may cool the second conveyor 310 and the condensing chamber 410 via the first cooling jacket 330 and the second cooling jacket 430, and the coolant having the temperature increased due to the heat exchange during a cooling process may be re-introduced into the coolant supply tank 70 again through the first coolant recovery unit 39 and the second coolant recovery unit 49. The coolant circulated so as to be introduced into the coolant supply tank 70 may be mixed with an external coolant introduced through the external coolant supply unit 73 so as to be re-supplied to the carbon black conveying module 300 and the condensing module 400 again.

The coolant used for cooling the carbon black conveying module 300 and the condensing module 400 may be recovered, mixed with the external coolant, and reused again, so that a problem (e.g., environmental pollution, etc.) that may occur when the coolant is imprudently drained to an outside of the pyrolysis device may be solved.

In addition, as shown in FIG. 1, according to the present invention, the device 1 for the continuous low-temperature pyrolysis may further include: an oil recovery tank 50 for recovering and storing the oil generated by the condensing module 400; an oil storage tank 60 for storing the oil conveyed to the oil recovery tank 50 (reception tank); and a second circulation pump 67 for supplying a part of the oil stored in the oil storage tank 60 to the condensing module 40. The oil storage tank 60 may store the oil conveyed from the oil recovery tank 50 therein, and supply the part of the stored oil to the condensing module 400.

The oil recovered and accommodated in the oil recovery tank 50 may be conveyed to the oil storage tank 60 through the oil supply pump 51, and the oil stored in the oil storage tank 60 may be conveyed to the oil supply unit 61 through a discharge line. In this case, the circulation pump 67 provided in the oil supply unit 61 may re-supply the part of the oil stored in the oil supply unit 61 to the condensing module 400.

The oil supplied to the condensing module 400 may be finely sprayed into the condensing chamber 410 through the first oil spray nozzle 420 so that condensation efficiency of the pyrolysis gas may be improved.

In other words, the pyrolysis gas having a relatively high temperature may make direct contact with the oil having a relatively low temperature so as to be rapidly cooled, so that condensation efficiency of the oil may be increased.

An air supply unit 63 may be provided in a lower portion of the oil storage tank 60, and a vent unit 65 may be provided in an upper portion of the oil storage tank 60. Air injected by the air supply unit 63 may generate air bubbling to remove an impurity (gas) contained in the oil stored in the oil storage tank 60, and the removed impurity may be discharged to the outside through the vent unit 65 provided in the upper portion of the storage tank 60.

In addition, a non-condensable pyrolysis gas blowing fan 470 may reuse a non-condensable pyrolysis gas (non-condensed pyrolysis gas) that has passed through the condensing module 400 as a raw material for the heating unit 250, so that energy efficiency may be increased.

In addition, a waste tire chip silo 120 of the waste tire chip supply module 100 may be preheated by using a heat source of a high-temperature exhaust gas discharged from an outlet of the heating jacket 230 or a non-condensable gas (pyrolysis gas) discharged from a condensing chamber 410.

As described above, the waste tire chip may be preheated before the waste tire chip is supplied into the pyrolysis reactor 270 of the pyrolysis module 200 to prevent a rapid temperature change when the waste tire chip is input into the pyrolysis reactor 270, so that pyrolysis efficiency may be further improved. In this case, a preheating temperature of the waste tire chip may be 100° C. to 150° C.

In addition, as shown in FIGS. 1, 12, and 13, according to the present invention the device 1 for the continuous low-temperature pyrolysis may further include a pyrolysis reactor cleaning module 900 for the pyrolysis module 200.

The pyrolysis reactor cleaning module 900 may include: a pyrolysis reactor opening stopper unit 910 provided to open and close an opening 901 formed at both ends of the pyrolysis reactor 270; a cleaning rod 920 input into the pyrolysis reactor 270 through the opening 901 when cleaning the pyrolysis reactor, and including a plurality of cleaning liquid spray nozzles 921; and a cleaning liquid high-pressure spray unit 930 for spraying a cleaning liquid at a high pressure through the cleaning liquid spray nozzle 921.

A bearing 940 for rotatably supporting the cleaning rod 920 may be installed at both ends of the cleaning rod 920, and the cleaning rod 920 may be installed so as to be rotatable by a driving motor 950.

When the pyrolysis reactor 270 is cleaned, first, the pyrolysis reactor opening stopper unit 910 may be separated to open the opening 901 formed at the both ends of the pyrolysis reactor 270, and the cleaning rod 920 may be inserted into the pyrolysis reactor 270.

Next, the cleaning liquid may be sprayed at the high pressure from the cleaning liquid high-pressure spray unit 930 through the cleaning liquid spray nozzle 921 to clean an inside of the pyrolysis reactor 270.

The cleaning rod 920 may be rotated by the driving motor 950 to clean an entire inner peripheral surface of the pyrolysis reactor 270.

Hereinafter, an operation of the device for the continuous low-temperature pyrolysis according to the present invention, which is configured as described above, will be described.

According to the device 1 for the continuous low-temperature pyrolysis of the present invention, the waste tire chips may be continuously input into the pyrolysis reactor 270, the pyrolysis reactor 270 may be heated by the heating unit 250, the waste tire chips may be pyrolyzed by the pyrolysis reactor 270 to generate the carbon black and the pyrolysis gas, the pyrolysis gas may be condensed while passing through the condensing module 400 to generate (extract) the oil, the carbon black may be conveyed by the carbon black conveying module 300, the carbon black may be recovered and stored by the carbon black recovery module 800, and the oil generated through the condensation process may be recovered into the oil recovery tank 50.

To elaborate, first, the waste tire chip supply module 100 may continuously supply the waste tire chips, such that the waste tire chips may be supplied by the intake method and the blowing method. In this case, the waste tire chips may be continuously supplied by the intake method and the blowing method, such that the waste tire chip supply blower 130 may be driven to re-suck the air from the back filter module 140, the waste tire chips may be blown and fed (supplied) into the waste tire chip silo 120 together with the sucked air, and the air inside the waste tire chip silo 120 may be sucked and removed, so that only the waste tire chips may be supplied into the pyrolysis reactor 270 while the introduction of the air is fundamentally blocked.

The silo selection valve 150 (opening/closing valve) installed in a lower portion of the waste tire chip silo 120 may open and close a waste tire supply line so as to be opened only toward one waste tire chip silo 120 that requires supply of the waste tire chip among the waste tire chip silos 120, so that the waste tire chip may be continuously input into the pyrolysis reactor 270.

In other words, the selection valve 150 may alternately block or open one waste tire chip silo 120 and another waste tire chip silo 120, such that the waste tire chips may be filled and introduced into the waste tire chip silo 120 in a blocking mode, and the waste tire chips may be continuously supplied into the pyrolysis reactor 270 by supplying the waste tire chips into the waste tire chip silo 120 in an opening mode, so that a continuous pyrolysis process may be enabled.

In addition, the waste tire chip silo 120 of the waste tire chip supply module 100 may be preheated by using the heat source of the high-temperature exhaust gas discharged from the outlet of the heating jacket 230 or the non-condensable gas (pyrolysis gas) discharged from the condensing chamber 410. The waste tire chip may be preheated before the waste tire chip is supplied into the pyrolysis reactor 270 of the pyrolysis module 200 to prevent a rapid temperature change when the waste tire chip is input into the pyrolysis reactor 270, so that the pyrolysis process may be operated stably and efficiently.

Among the carbon black and the pyrolysis gas generated by the pyrolysis reaction of the pyrolysis reactor 270, the carbon black may be cooled while being conveyed by the carbon black conveying module 300, and stored in the carbon black recovery silo 820, the pyrolysis gas may be conveyed to the condensing module 400 and subjected to the condensation process to generate the oil, and the oil may be recovered into the oil recovery tank 50 and stored in the oil supply unit 61.

The non-condensable pyrolysis gas that has passed through the condensing module 400 may be used as a raw material for the heating unit 250, for example, a heating wind stove, by the non-condensable pyrolysis gas blowing fan 470, so that thermal efficiency may be increased.

The part of the oil stored in the oil supply unit 61 may be re-supplied to the condensing module 400 again by the circulation pump 67. In this case, an oil film may be formed while spraying the oil upward from the first oil spray nozzle 420, such that a contact area between the pyrolysis gas, which has a relatively high temperature, and the oil film may be expanded to increase the condensation efficiency of the pyrolysis gas, so that an oil recovery amount may be improved.

Furthermore, the foreign substance removal nozzle 450 may be installed inside the condensing chamber 410 to spray the oil at the high pressure toward the pyrolysis gas, so that the foreign substance included in the pyrolysis gas may be collected and removed.

In addition, the coolant stored in the coolant supply tank 70 may be supplied into the first cooling jacket 330 of the carbon black conveying module 300 and the second cooling jacket 430 of the condensing chamber 410 to reduce a temperature of the conveyed carbon black so as to prevent spontaneous combustion of the carbon black, the oil may be generated by condensing the pyrolysis gas, and the coolant used in the cooling process may be re-introduced into the coolant supply tank 70 again, mixed with the external coolant supplied from the outside, and reused as a coolant.

Meanwhile, according to the present invention, there may be provided a method for continuous low-temperature pyrolysis, which continuously supplies a waste tire chip, performs low-temperature pyrolysis to generate carbon black and a pyrolysis gas, and condenses the pyrolysis gas to generate oil, wherein the waste tire chip is continuously supplied by a pneumatic method of an intake method and a blowing method, such that a waste tire chip supply blower 130 is driven to re-suck air from a back filter module 140, and blow and feed the waste tire chip together with the sucked air into a waste tire chip silo 120, and the back filter module 140 is driven to suck and remove the air inside the waste tire chip silo 120 so as to supply only the waste tire chip into a pyrolysis reactor 270 and block introduction of the air.

A plurality of waste tire chip silos may be installed in a parallel structure, such that a silo selection valve 150 installed in a lower portion of the waste tire chip silo 120 may open and close a waste tire supply line so as to be opened only toward one waste tire chip silo 120 that requires supply of the waste tire chip among the waste tire chip silos 120, so that the waste tire chip may be continuously input into the pyrolysis reactor 270.

In addition, a carbon recovery hose 810 may be connected to a carbon black discharge part 313 of a carbon black conveying module 300 at a gap G) to recover and store the carbon black, and a carbon black collection blower 830 may be driven to suck the carbon black into a carbon black recovery silo 820 through the carbon recovery hose 810, such that a vacuum pressure (negative pressure) may be formed inside the carbon black recovery silo 820, and the carbon black may be rapidly collected by a suction supply scheme while external air is sucked through the gap G, so that recovery efficiency of the carbon black may be increased.

As described above, the present invention may have the following effects.

First, waste tire chips may be continuously supplied, such that a pneumatic method of an intake method and a blowing method may be adopted to rapidly feed (supply) the waste tire chips by a simple scheme and supply only the waste tire chips into a pyrolysis reactor while introduction of air is fundamentally blocked, so that pyrolysis efficiency of the pyrolysis reactor can be increased, and an explosive reaction can be prevented; and unlike the related art, a mechanical conveyor supply scheme may not be used, so that a waste tire chip supply facility can be miniaturized and modularized, which enables a compact design of a pyrolysis facility, a pyrolysis operation can be facilitated, maintenance and repair can be facilitated, and a site area of the pyrolysis facility, a cost of manpower input for supplying the waste tire chips, or the like can be significantly reduced.

Second, a plurality of waste tire chip silos may be installed in a parallel structure, such that a waste tire supply line may be opened and closed so as to be opened only toward one waste tire chip silo that requires supply of the waste tire chip among the waste tire chip silos by a control of a silo selection valve installed in a lower portion of the waste tire chip silo, so that the waste tire chip can be continuously input (supplied) into the pyrolysis reactor.

Third, a condensing module for condensing a pyrolysis gas to generate oil may form an oil film while spraying oil upward into a condensing chamber to expand a contact area between the pyrolysis gas, which has a relatively high temperature, and the oil film, so that condensation efficiency of the pyrolysis gas can be increased, and the oil may be sprayed at a high pressure toward the pyrolysis gas to collect a foreign substance included in the pyrolysis gas and allow the foreign substance to be dropped downward, so that high-quality oil can be extracted.

Fourth, carbon black may be recovered into a recovery silo by a suction supply scheme, such that a vacuum pressure (negative pressure) may be formed inside the carbon black recovery silo, and the carbon black may be rapidly collected by the suction supply scheme while external air is sucked through a gap, so that recovery efficiency of the carbon black can be improved; and unlike the related art, a mechanical conveyor recovery scheme may be not used, so that a carbon black recovery facility can be miniaturized and modularized, which enables a compact design of a pyrolysis facility, a pyrolysis operation can be facilitated, maintenance and repair can be facilitated, and a site area of the pyrolysis facility, a cost of manpower input for recovering the carbon black, or the like can be significantly reduced.

Fifth, while installing a screw shaft inside a pyrolysis reactor of a pyrolysis module, the screw shaft may be arranged eccentrically with respect to a center of the pyrolysis reactor, so that clogging of a waste tire chip can be effectively prevented, and a pyrolysis reactor cleaning module may be provided so that an inside of the pyrolysis reactor can be efficiently cleaned after pyrolysis is completed.

Meanwhile, the exemplary embodiment of the present invention has been disclosed in the present disclosure and the drawings, and although specific terms have been used, the terms are merely used to have a general meaning for easily describing the technical content of the present invention and assisting understanding of the invention, and the terms are not intended to limit the scope of the present invention. It is obvious to a person having ordinary skill in the art to which the present invention pertains that other modifications based on the technical idea of the present invention can be implemented in addition to the embodiments disclosed herein.

Various modifications can be made to the present invention, and the present invention may have various forms. However, it is to be understood that the present invention is not limited to a particular form set forth in the detailed description. Rather, it is to be understood that the present invention encompasses all modifications, equivalents, and substitutes within the idea and scope of the present invention as defined by the appended claims.

The invention claimed is:

1. A device for continuous low-temperature pyrolysis, which continuously supplies a waste tire chip, performs low-temperature pyrolysis to generate carbon black and a pyrolysis gas, and condenses the pyrolysis gas to generate oil, the device comprising:
    a waste tire chip supply module configured to supply the waste tire chip;
    a pyrolysis module configured to pyrolyze the waste tire chip supplied from the waste tire chip supply module to generate the carbon black and the pyrolysis gas;
    a conveyor configured to convey the carbon black generated by the pyrolysis module to an outside of the pyrolysis module;
    a carbon black recovery module configured to convey and store the carbon black, which is conveyed by the conveyor, into a carbon black storage tank;
    a condenser configured to condense the pyrolysis gas generated by the pyrolysis module to generate the oil; and
    an oil recovery tank configured to recover the oil generated by the condenser, wherein for continuously supplying the waste tire chip by an intake method and a blowing method, the waste tire chip supply module includes:
a waste tire chip supply hopper configured for inputting the waste tire chip into a pyrolysis reactor of the pyrolysis module;
a waste tire chip silo configured for temporarily storing the waste tire chip supplied from the waste tire chip supply hopper, and supplying the waste tire chip into a first conveyor of the pyrolysis module;
a silo selection valve configured for supplying the waste tire chip by alternately selecting the waste tire chip silo so that the waste tire chip is continuously supplied into the first conveyor; a back filter configured for collecting (adsorbing) and filtering out a foreign substance introduced into the waste tire chip silo; and
a waste tire chip supply blower configured for sucking air introduced into the waste tire chip silo, and blowing the waste tire chip together with the air into the waste tire chip silo to supply the waste tire chip and the air,
wherein the waste tire chip silo is installed in a plurality of parallel structure,
wherein a waste tire chip supply blocking unit configured for selectively supplying or blocking the waste tire chip is installed in a lower portion of the waste tire chip silo,
wherein a nitrogen gas inlet is installed in a lower portion of the waste tire chip silo to prevent an explosive reaction caused by an introduction of the air into the pyrolysis reactor of the pyrolysis module,
wherein the waste tire chip supply blocking unit configured for supplying a waste tire chip into the pyrolysis reactor in a state that nitrogen gas (N2) has been supplied into the pyrolysis reactor, and a waste tire chip supply blower is driven to re-suck air from a back filter module, and blow and feed the waste tire chip together with a sucked air into the waste tire chip silo, and the air inside the waste tire chip silo is sucked and removed to supply only the waste tire chip into the pyrolysis reactor and block introduction of the air,
wherein the carbon black recovery module includes:
a carbon recovery hose connected to a carbon black discharge part of the conveyor at a gap (G) to introduce external air;
a carbon black recovery silo connected to the carbon recovery hose to recover and store the carbon black;
a carbon black collection blower configured for sucking the carbon black into the carbon black recovery silo through the carbon recovery hose, such that a vacuum pressure (negative pressure) is formed inside the carbon black recovery silo, and the carbon black is collected while the external air is sucked through the gap (G);
a back filter configured for filtering out a foreign substance inside the carbon black recovery silo; and
an actuator configured for controlling the gap G,
wherein a movable flange is formed in the carbon recovery hose, and a screw rod of the actuator is coupled to the movable flange in a screw structure, so that as the actuator rotates the screw rod, the movable flange moves up and down (in the drawings') to adjust a size of the gap G, in which a black carbon suction amount is adjusted by adjusting an external air introduction amount while expanding or reducing the gap G by control of the actuator, and thus the carbon black is recovered.

2. The device of claim 1, wherein the pyrolysis module (200) includes:

a pyrolysis reactor (270) for accommodating the waste tire chip supplied from the waste tire chip supply module (100);
a screw shaft (280) rotatably installed inside the pyrolysis reactor (270) to stir and convey the waste tire chip accommodated in the pyrolysis reactor (270), such that the screw shaft (280) is installed eccentrically with respect to a center of the pyrolysis reactor (270) to prevent clogging of the waste tire chip;
a screw shaft driving motor for rotating the screw shaft (280);
a first conveyor (210) connected to one side of the pyrolysis reactor (270) to input the waste tire chip into the pyrolysis reactor (270);
a heating jacket (230) installed on an outer periphery of the pyrolysis reactor (270) to heat the outer periphery of the pyrolysis reactor (270) to pyrolyze the waste tire chip; and
a heating unit (250) for supplying heat into the heating jacket (230).

3. The device of claim 2, further comprising a non-condensable pyrolysis gas blowing fan (470) for using a non-condensed pyrolysis gas that has passed through the condenser (400) as a raw material for the heating unit (250).

4. The device of claim 2, wherein the waste tire chip silo (120) of the waste tire chip supply module (100) is preheated by using a heat source of an exhaust gas discharged from an outlet of the heating jacket (230) or a non-condensable gas discharged from a condensing chamber (410).

5. The device of claim 1, wherein the conveyor includes:
a screw conveyor (311) for conveying the carbon black generated by a pyrolysis reactor (270) of the pyrolysis module (200) to an outside of the pyrolysis reactor (270), and having one side formed with a carbon black introduction part (312) for introducing the carbon black and an opposite side formed with a carbon black discharge part (313) for discharging the carbon black; and
a first cooling jacket (330) connected to a coolant supply tank (70) for supplying a coolant, and installed on an outer periphery of the second conveyor (310) to cool the carbon black conveyed from the second conveyor (310).

6. The device of claim 5, wherein an ejector (850) having a venturi structure is installed between the carbon black discharge part (313) and the carbon recovery hose (810) to rapidly discharge the carbon black.

7. The device of claim 1, further comprising:
an oil storage tank (60) for storing the oil conveyed to the oil recovery tank (50); and
a circulation pump (67) for supplying a part of the oil stored in the oil storage tank (60) to the condenser (400).

8. The device of claim 7, wherein an air supply line (63) is installed in a lower portion of the oil storage tank (60), and an impurity vent unit (65) is installed in an upper portion of the oil storage tank (60), so that air injected by the air supply line (63) generates air bubbling to remove an impurity contained in the oil stored in the oil storage tank (60), and the removed impurity is discharged to an outside of the oil storage tank (60) through the impurity vent unit (65).

9. The device of claim 7, wherein the condenser (400) includes:
at least one condensing chamber (410) for condensing the pyrolysis gas supplied from a pyrolysis reactor (270) of the pyrolysis module (200) to generate the oil;

a second cooling jacket (430) connected to a coolant supply tank (70) for supplying a coolant, and installed on an outer periphery of the condensing chamber (410) to cool and condense the pyrolysis gas; and a first oil spray nozzle (420) installed inside the condensing chamber (410), the first oil spray nozzle configured to spray the oil to form an oil film, and a contact area between the pyrolysis gas, and the oil film is expanded such that condensation efficiency of the pyrolysis gas increases.

10. The device of claim 9, wherein, when a plurality of condensing chambers (410) are provided, the condensing chambers (410) are connected to each other by a connection pipe (411) so that the pyrolysis gas is sequentially condensed, and a second oil spray nozzle (440) for spraying the oil is installed inside the connection pipe (411) to rapidly cool the pyrolysis gas.

11. The device of claim 9, wherein a foreign substance removal nozzle (450) for spraying the oil toward the pyrolysis gas to collect a foreign substance included in the pyrolysis gas and allow the foreign substance to be dropped downward is installed inside the condensing chamber (410).

12. The device of claim 11, wherein a foreign substance filter unit (460) for filtering out the foreign substance is provided directly under the foreign substance removal nozzle (450).

13. The device of claim 1, further comprising a pyrolysis reactor cleaning module (900) for cleaning an inside of a pyrolysis reactor (270) of the pyrolysis module (200), wherein the pyrolysis reactor cleaning module (900) includes:

a pyrolysis reactor hatch configured to open and close an opening (901) formed at both ends of the pyrolysis reactor (270);

a cleaning rod (920) input into the pyrolysis reactor (270) through the opening (901) when cleaning an inside of the pyrolysis reactor, and including a plurality of cleaning liquid spray nozzles (921);

wherein when the pyrolysis reactor (270) is cleaned, the pyrolysis reactor hatch is separated to open the opening (901) formed at both ends of the pyrolysis reactor (270), and the cleaning rod (920) is inserted into the pyrolysis reactor (270), and wherein the cleaning liquid is sprayed at a predetermined pressure through the cleaning liquid spray nozzle (921) with rotation of the cleaning rod (920) to clean an inside of the pyrolysis reactor (270).

14. The device of claim 13, wherein a bearing (940) for rotatably supporting the cleaning rod (920) is installed at both ends of the cleaning rod (920), and the cleaning rod (920) is installed so as to be rotatable by a driving motor (950).

* * * * *